(12) United States Patent
Wei et al.

(10) Patent No.: US 12,491,180 B2
(45) Date of Patent: *Dec. 9, 2025

(54) APPLICATION OF COMPOUND IN TREATING PNEUMONIA

(71) Applicant: SHENZHEN OPTIMUM BIOLOGICAL TECHNOLOGY CO., LTD., Shenzhen (CN)

(72) Inventors: Xiawei Wei, Chengdu (CN); Zhigang Huang, Shanghai (CN); Charles Z. Ding, Shanghai (CN); Yuquan Wei, Chengdu (CN)

(73) Assignee: SHENZHEN OPTIMUM BIOLOGICAL TECHNOLOGY CO., LTD, Jiangsu (CN)

( * ) Notice: Subject to any disclaimer, the term of this patent is extended or adjusted under 35 U.S.C. 154(b) by 789 days.

This patent is subject to a terminal disclaimer.

(21) Appl. No.: 17/787,631

(22) PCT Filed: Dec. 18, 2020

(86) PCT No.: PCT/CN2020/137612
§ 371 (c)(1),
(2) Date: Jul. 27, 2022

(87) PCT Pub. No.: WO2021/121387
PCT Pub. Date: Jun. 24, 2021

(65) Prior Publication Data
US 2023/0022708 A1    Jan. 26, 2023

(30) Foreign Application Priority Data
Dec. 19, 2019   (CN) .......................... 201911316803

(51) Int. Cl.
*A61K 31/427*   (2006.01)
*A61P 31/04*    (2006.01)

(52) U.S. Cl.
CPC ............ *A61K 31/427* (2013.01); *A61P 31/04* (2018.01)

(58) Field of Classification Search
CPC ................ A61K 31/427; A61K 31/454; A61K 31/4545; A61P 31/04; Y02A 50/30; C07D 417/14
See application file for complete search history.

(56) References Cited

U.S. PATENT DOCUMENTS 5,290,929 A      3/1994  Koster et al.
11,459,323 B2 *  10/2022 Gu et al.
(Continued)

FOREIGN PATENT DOCUMENTS

EP    0531976 A1   3/1993
EP    0484881 B1   4/1999
(Continued)

OTHER PUBLICATIONS

Mar. 20, 2024 Chinese Second Office Action issued in Chinese Patent Application No. CN202080084613.1.
(Continued)

*Primary Examiner* — Robert T. Crow
*Assistant Examiner* — Jackson J Hernandez
(74) *Attorney, Agent, or Firm* — Harness, Dickey & Pierce, P.L.C.

(57) ABSTRACT

The present invention relates to a use of a compound represented by formula (I) and a pharmaceutically acceptable salt thereof in the field of pharmaceutics, and in particular an application thereof in the preparation of a drug for treating pneumonia.

(Continued)

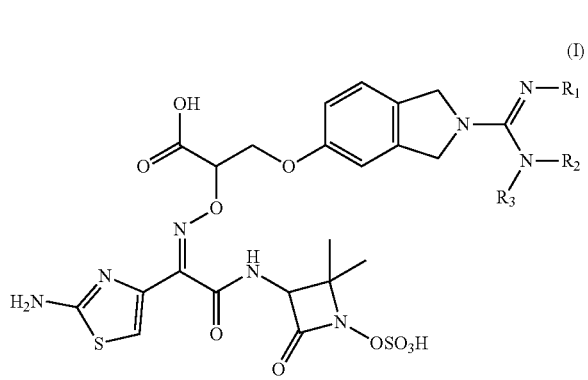

17 Claims, 1 Drawing Sheet

(56) References Cited

U.S. PATENT DOCUMENTS

| | | | |
|---|---|---|---|
| 2015/0266867 A1* | 9/2015 | Aulakh et al. | |
| 2020/0010467 A1 | 1/2020 | Hu et al. | |
| 2021/0115035 A1 | 4/2021 | Gu et al. | |
| 2022/0062244 A1 | 3/2022 | Wei et al. | |

FOREIGN PATENT DOCUMENTS

| | | | |
|---|---|---|---|
| WO | WO-2002022613 | A1 | 3/2002 |
| WO | WO-2007065288 | A2 | 6/2007 |
| WO | WO-2008116813 | A2 | 10/2008 |
| WO | WO-2010070523 | A1 | 6/2010 |
| WO | WO-2013110643 | A1 | 8/2013 |
| WO | WO-2015148379 | A1 | 10/2015 |
| WO | WO-2017050218 | A1 | 3/2017 |
| WO | WO-2017106064 | A1 | 6/2017 |
| WO | WO-2017155765 | A1 | 9/2017 |
| WO | WO-2017206947 | A1 | 12/2017 |
| WO | WO-2018065636 | A1 | 4/2018 |
| WO | WO-2019144969 | A1 | 8/2019 |
| WO | WO-2020125670 | A1 | 6/2020 |

OTHER PUBLICATIONS

Dec. 13, 2023 Extended European Search Report issued in European Patent Application No. EP20903734.0.
Mar. 18, 2021 International Search Report issued in International Patent Application No. PCT/CN2020/137612.
Mar. 18, 2021 Written Opinion of the International Searching Authority issued in International Patent Application No. PCT/CN2020/137612.
May 17, 2022 International Preliminary Report on Patentability issued in International Patent Application No. PCT/CN2020/137612.
Nature, 2017, 543, 15.
Clin. Inf. Dis., 2009, 48, 1-12.
Rev. Infect. Dis., 1985, 7, 579-593.
Berge et al., "Pharmaceutical Salts", Journal of Pharmaceutical Science 66: 1-19 (1977).
Remington: The Science and Practice of Pharmacy, 21st Ed., Lippincott, Williams & Wilkins (2005).
Chinese Patent Application No. 201911316803.7 (not published).
Apr. 28, 2023 Chinese First Office Action issued in Chinese Patent Application No. 202080084613.1.
Apr. 27, 2023 Chinese Search Report issued in Chinese Patent Application No. 202080084613.1.

\* cited by examiner

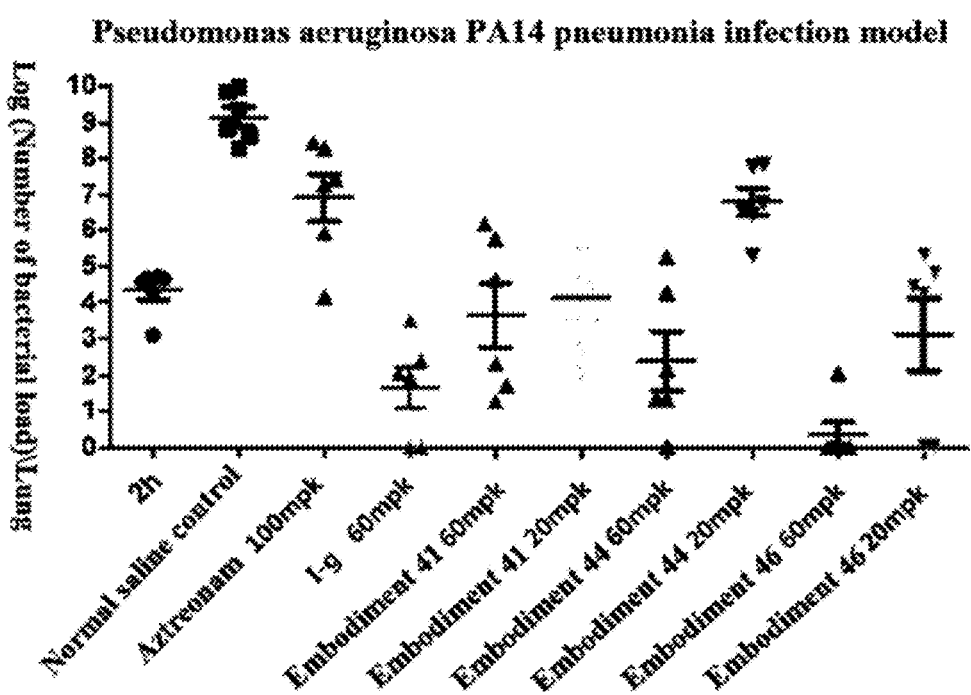

APPLICATION OF COMPOUND IN TREATING PNEUMONIA

CROSS-REFERENCE TO RELATED APPLICATIONS

This application is a U.S. National Phase Application under 35 U.S.C. 371 of International Application No. PCT/CN2020/137612, filed on Dec. 18, 2020, which claims the benefit of Chinese Patent Application No. CN 201911316803.7, filed Dec. 19, 2019. The entire disclosures of the above applications are incorporated herein by reference.

TECHNICAL FIELD

The present disclosure relates to a use of a compound represented by formula (I) and a pharmaceutically acceptable salt thereof in the field of pharmaceutics.

BACKGROUND

The emergence and spread of drug-resistant bacteria are widely recognized by public health experts and officials as one of the major public health problems of the 21st century. The frequency of antimicrobial drug resistance and its association with serious infectious diseases have increased at an alarming rate. The growing prevalence of drug resistance in nosocomial pathogens is particularly troubling. Of the more than 2 million nosocomial infections that occur each year in the United States, 50 to 60 percent are caused by antibiotic-resistant bacteria. High rates of drug resistance to commonly used antimicrobial drugs increase morbidity, mortality, and costs associated with nosocomial infections. The number of patients dying from untreatable nosocomial infections continues to grow, and 700,000 people are being killed globally each year because of drug-resistant bacteria, and the figure will increase to 10 million by 2050 if no new therapeutic drugs or treatment protocols are developed (Nature, 2017, 543, 15). Treatment modes selectable for infections caused by multidrug-resistant Gram-negative bacteria (including enterobacteriaceae and non-fermenting bacteria) are particularly limited, and the more serious problem is that research and development lines of the pharmaceutical industry contain few compounds capable of breaking bacterial resistance (Clin. Inf. Dis., 2009, 48, 1-12).

A very successful and well-tolerated class of β-lactam antibiotics has been the mainstay of treatment of infections caused by Gram-negative pathogens over the past few decades. Among them, especially third-generation cephalosporins, carbapenems and monocyclic lactams are widely used to treat infections caused by Gram-negative bacteria. But the emergence of an increasing number of lactamases resistance mechanisms and other resistance mechanisms seriously jeopardizes the medium-term availability of current compounds in these subclasses, especially extended-spectrum β-lactamases (ESBLs) and carbapenemases are important motives to produce drug resistance. Therefore, new β-lactam antibiotics that can break through drug resistance are urgently needed to fill the gap.

Aztreonam is the only FDA-approved monocyclic β-lactam used worldwide and the second analog (tigemonam) marketed only in Japan, and the value of monocyclic β-lactam antibiotics is far from being excavated (Rev. Infect. Dis., 1985, 7, 579-593). On the other hand, the drug resistance of bacteria makes the permeability of aztreonam worse, enhances the efflux effect, and narrows the antibacterial spectrum. In order to improve the permeability of monocyclic β-lactam to bacteria, Basilea (WO 2007065288), Naeja Pharmaceuticals (WO 2002022613) and Squibb & Sons (MS 5290929, EP 531976, EP 484881) introduced siderophores uptake system on the monocyclic β-lactam molecule. Recently, Pfizer restudied monocyclic β-lactams carrying a sulfonylaminocarbonyl activating group at the N1-position (WO 2010070523). In addition, in WO 2008116813, Basilea described a combination therapy using monocyclic β-lactams and carbapenems. AiCuris (WO 2013110643) and Novartis (WO 2015148379) respectively reported studies on improving the activity by modifying the substituents on the aztreonam molecule. The structural formula of the compound is shown below, in which the group A is an aromatic ring connected with an amidino group and a guanidino group. Novartis (WO 2017050218) also reported a salt-type of one of the compounds, these compounds are currently in preclinical or clinical development stages.

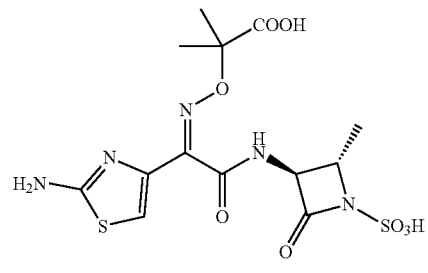

Aztreonam

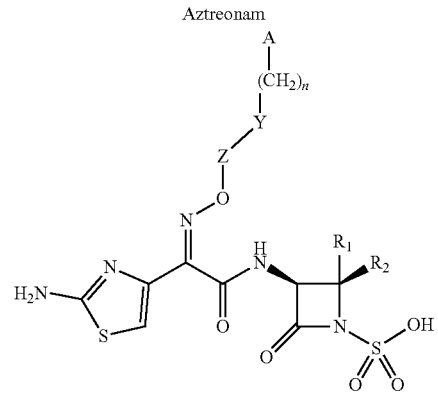

AiCuris
WO2013110643A1

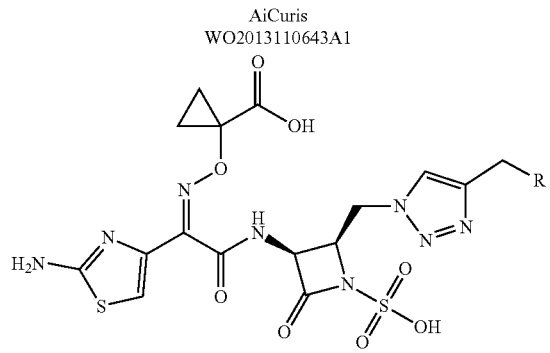

Novartis
WO2015148379A1

Content of the Present Invention

The present disclosure provides a use of a compound represented by formula (I) or a pharmaceutically acceptable salt thereof in the manufacture of a medicament for the treatment of pneumonia,

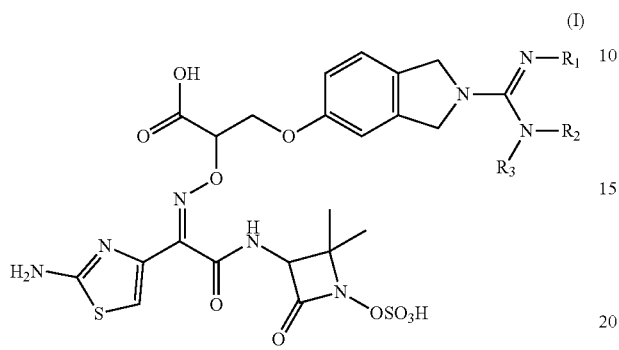

(I)

wherein,
$R_1$ is selected from H and piperidinyl;
$R_2$ is selected from $-(O)_m-(CH_2)_n-NH_2$ and piperidinyl;
$R_3$ is selected from H and $-(CH_2)_n-NH_2$;
m is 0 or 1;
n is 1, 2 or 3.

In some embodiments of the present disclosure, the $R_2$ is selected from $-O-(CH_2)_2-NH_2$, $-(CH_2)_2-NH_2$, $-(CH_2)_3-NH_2$ and piperidinyl.

In some embodiments of the present disclosure, the $R_3$ is selected from H, $-(CH_2)_2-NH_2$ and $-(CH_2)_3-NH_2$.

In some embodiments of the present disclosure, the $R_1$ is selected from H, and the $R_2$ is selected from $-(CH_2)_2-NH_2$ and

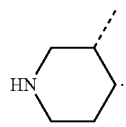

In some embodiments of the present disclosure, the $R_1$ is selected from piperidinyl, and the $R_2$ is selected from piperidinyl.

In some embodiments of the present disclosure, the $R_1$ is selected from

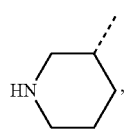

and the $R_2$ is selected from

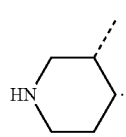

In some embodiments of the present disclosure, the structural moiety

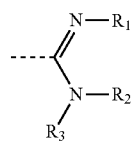

is selected from

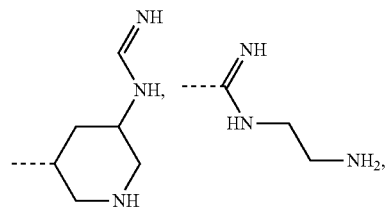

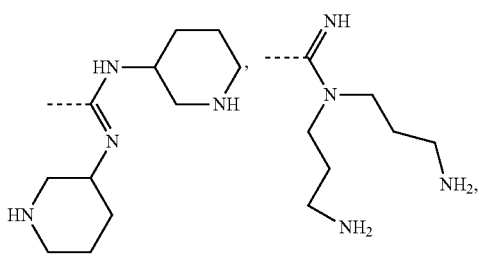

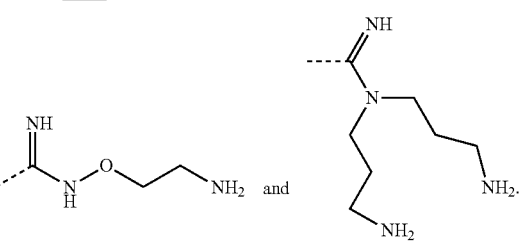

The present disclosure provides a use of a compound represented by the following formula and a pharmaceutically acceptable salt thereof in the manufacture of a medicament for the treatment of pneumonia, wherein, the compound is selected from

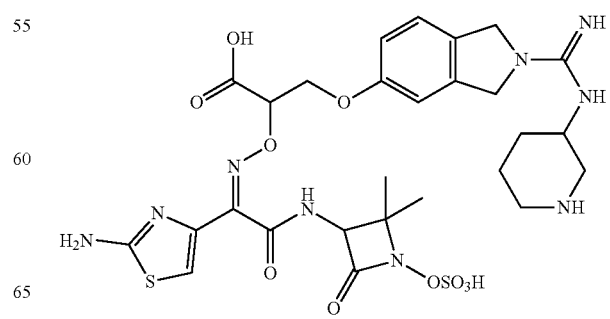

-continued
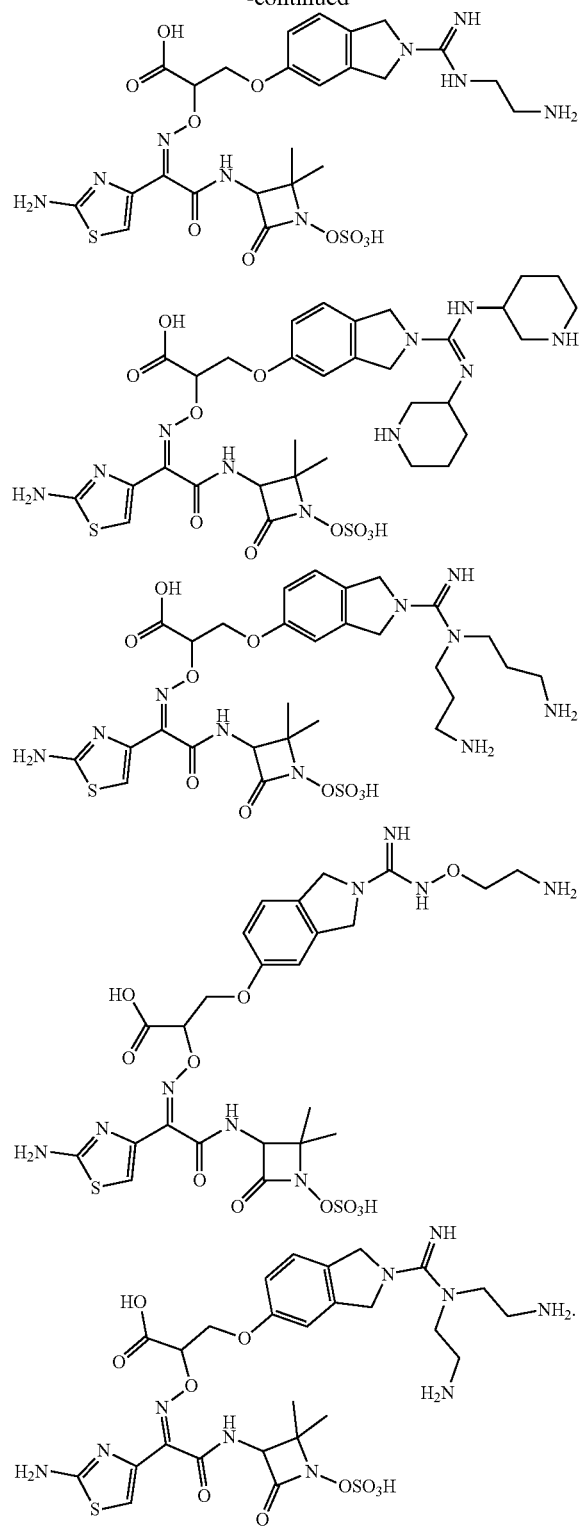
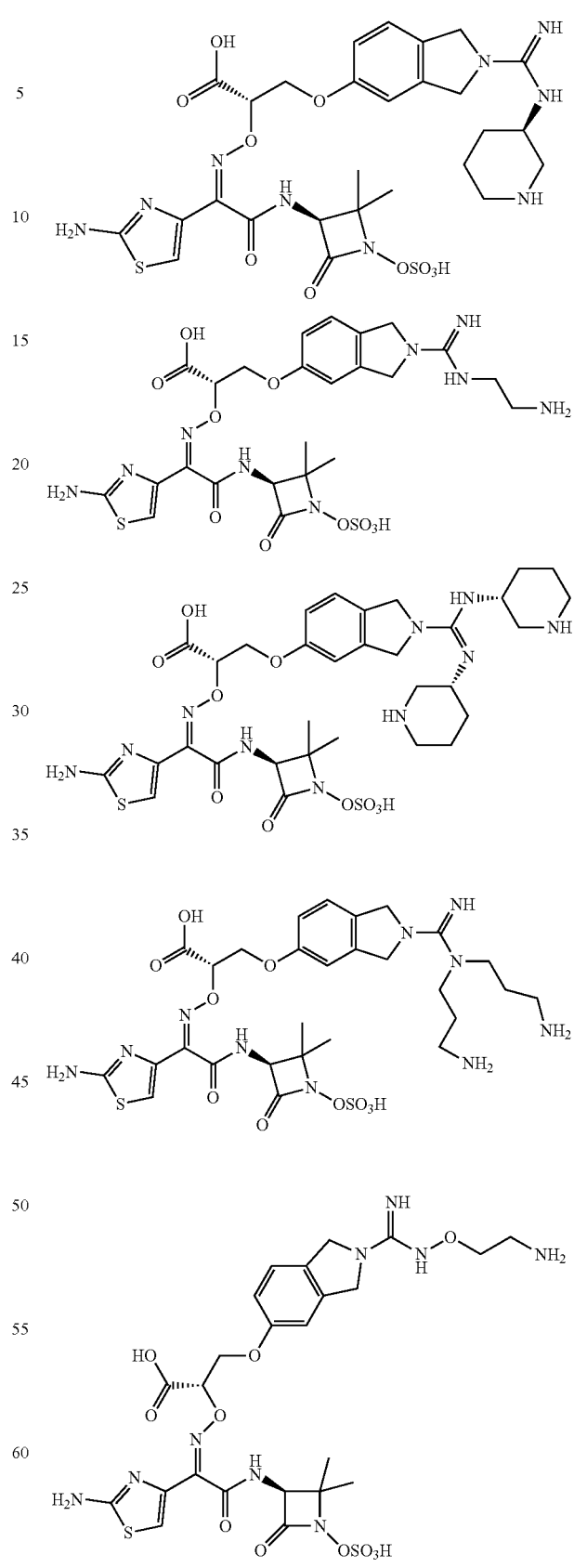
In some embodiments of the present disclosure, the compound is selected from

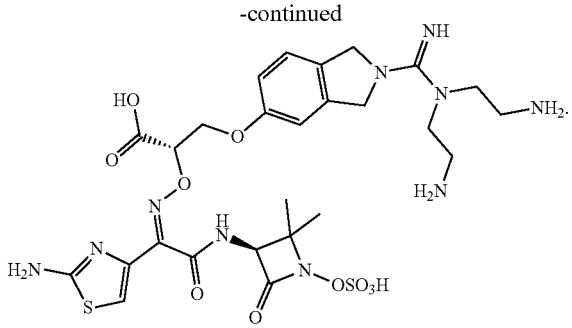

In some embodiments of the present disclosure, the pneumonia is caused by infection with *Pseudomonas aeruginosa*.

In some embodiments of the present disclosure, the pneumonia is caused by infection with one, two or multiple carbapenem-resistant bacteria, wherein the carbapenem-resistant bacteria comprise carbapenem-resistant *Klebsiella pneumoniae*, carbapenem-resistant *Escherichia coli*, carbapenem-resistant *Enterobacter cloacae*, carbapenem-resistant *Enterobacter aerogenes*, carbapenem-resistant *Klebsiella oxytoca*, carbapenem-resistant *Citrobacter freundii*, carbapenem-resistant *Acinetobacter baumannii* and carbapenem-resistant *Serratia marcescens*.

In some embodiments of the present disclosure, the pneumonia is caused by infection with one, two or multiple carbapenem susceptible bacteria, wherein the carbapenem susceptible bacteria comprise carbapenem susceptible *Klebsiella pneumoniae*, carbapenem susceptible *Escherichia coli*, carbapenem susceptible *Enterobacter cloacae* and carbapenem susceptible *Citrobacter freundii*.

In some embodiments of the present disclosure, the pneumonia is caused by infection with carbapenem-resistant *Enterobacter cloacae*, carbapenem-resistant *Enterobacter aerogenes*, carbapenem-resistant *Klebsiella oxytoca*, carbapenem-resistant *Citrobacter freundii*, carbapenem-resistant *Serratia marcescens*, carbapenem susceptible *Enterobacter cloacae* and/or carbapenem susceptible *Citrobacter freundii*.

Technical Effect

The compounds of the present disclosure have remarkable antibacterial activity to *Pseudomonas aeruginosa*, CRE bacteria and CSE bacteria.

Definition and Description

Unless otherwise specified, the following terms and phrases when used herein have the following meanings. A specific term or phrase should not be considered indefinite or unclear in the absence of a particular definition, but should be understood in the ordinary sense. When a trade name appears herein, it is intended to refer to its corresponding commodity or active ingredient thereof. The term "pharmaceutically acceptable" is used herein in terms of those compounds, materials, compositions, and/or dosage forms, which are suitable for use in contact with human and animal tissues within the scope of reliable medical judgment, with no excessive toxicity, irritation, an allergic reaction or other problems or complications, commensurate with a reasonable benefit/risk ratio.

The term "pharmaceutically acceptable salt" refers to a salt of the compound of the present disclosure that is prepared by reacting the compound having a specific constituent of the present disclosure with a relatively non-toxic acid or base. When the compound of the present disclosure contains a relatively acidic functional group, a base addition salt can be obtained by bringing the neutral form of the compound into contact with a sufficient amount of base in a pure solution or a suitable inert solvent. The pharmaceutically acceptable base addition salt includes a salt of sodium, potassium, calcium, ammonium, organic ammonia or magnesium, or similar salts. When the compound of the present disclosure contains a relatively basic functional group, an acid addition salt can be obtained by bringing the neutral form of the compound into contact with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like (see Berge et al., "Pharmaceutical Salts", Journal of Pharmaceutical Science 66: 1-19 (1977)). Certain specific compounds of the present disclosure contain both basic and acidic functional groups, thus can be converted to any base or acid addition salt.

Preferably, the neutral form of the compound is regenerated by contacting the salt with a base or acid in a conventional manner and isolating the parent compound. The parent form of the compound differs from its various salt forms by certain physical properties, such as solubility in polar solvents.

As used herein, "pharmaceutically acceptable salt" pertains to derivatives of compounds of the present disclosure, wherein, the parent compound is modified by forming a salt with an acid or a base. Examples of pharmaceutically acceptable salts include, but are not limited to, basic moieties such as inorganic or organic acid salts of amines, acidic moieties such as alkali metal of carboxylic acids or organic salts and the like. Pharmaceutically acceptable salts include conventional non-toxic salts or quaternary ammonium salts of the parent compound, such as those formed from non-toxic inorganic or organic acids. Conventional non-toxic salts include, but are not limited to, those derived from inorganic and organic acids selected from 2-acetoxybenzoic acid, 2-hydroxyethanesulfonic acid, acetic acid, ascorbic acid, benzenesulfonic acid, benzoic acid, bicarbonate, carbonic acid, citric acid, edetic acid, ethanedisulfonic acid, ethanesulfonic acid, fumaric acid, glucoheptose, gluconic acid, glutamic acid, glycolic acid, hydrobromic acid, hydrochloric acid, hydroiodide, hydroxy, hydroxynaphthalene, isethionic acid, lactic acid, lactose, dodecylsulfonic acid, maleic acid, malic acid, mandelic acid, methanesulfonic acid, nitric acid, oxalic acid, pamoic acid, pantothenic acid, phenylacetic acid, phosphoric acid, polygalacturonic acid, propionic acid, salicylic acid, stearic acid, calcium folinate, succinic acid, sulfamic acid, p-aminobenzenesulfonic acid, sulfuric acid, tannin, tartaric acid and p-toluenesulfonic acid.

The pharmaceutically acceptable salt of the present disclosure can be prepared from the parent compound that contains an acidic or basic moiety by conventional chemical method. Generally, such salt can be prepared by reacting the free acid or base form of the compound with a stoichiometric amount of an appropriate base or acid in water or an organic solvent or a mixture thereof. Generally, non-aqueous media such as ether, ethyl acetate, ethanol, isopropanol or acetonitrile are preferred.

In addition to salt form, the compound provided by the present disclosure also has a prodrug form. The prodrugs of the compounds described herein can easily undergo chemical changes under physiological conditions to transform into the compounds of the disclosure. In addition, prodrugs can be converted to the compounds of the present disclosure by chemical or biochemical methods in the in vivo environment.

Certain compounds of the present disclosure may exist in unsolvated or solvated forms, including hydrated forms. Generally, the solvated form is equivalent to the unsolvated form, and both are in the scope of the present disclosure.

Certain compounds of the present disclosure may have asymmetric carbon atoms (optical centers) or double bonds. Racemates, diastereomers, geometric isomers and individual isomers are included within the scope of the present disclosure.

Unless otherwise specified, the absolute configuration of a stereocenter is represented by the solid wedge bond ( ⌿ ) and the dashed wedge bond ( ⋰ ) the solid wedge bond ( ⌿ ) or the dashed wedge bond ( ⋰ ) is represented by the wave line ( ⁓ ), the relative configuration of a stereocenter is represented by the straight solid bond ( ⌿ ) and the straight dashed bond ( ⋰ ). When the compounds described herein contain olefinic double bonds or other centers of geometric asymmetry, they include E, Z geometric isomers unless otherwise specified. Likewise, all tautomer forms are included within the scope of the present disclosure.

The compounds of the present disclosure may exist in specific geometric or stereoisomeric forms. The present disclosure contemplates all such compounds, including cis and trans isomers, (−)- and (+)-enantiomers, (R)- and (S)-enantiomers, diastereomers isomers, (D)-isomers, (L)-isomers, and racemic and other mixtures thereof, such as enantiomers or diastereomeric enriched mixtures, all of which are within the scope of the present disclosure. Additional asymmetric carbon atoms may be present in substituents such as alkyl. All these isomers and their mixtures are included within the scope of the present disclosure.

Optically active (R)- and (S)-isomer, or D and L isomer can be prepared using chiral synthesis or chiral reagents or other conventional techniques. If one kind of enantiomer of certain compound of the present disclosure is to be obtained, the enantiomer can be prepared by asymmetric synthesis or derivative with chiral auxiliary, in which the obtained diastereomer mixture is separated and the auxiliary group is split to provide the pure required enantiomer. Alternatively, when the molecule contains a basic functional group (such as amino) or an acidic functional group (such as carboxyl), the compound reacts with an appropriate optically active acid or base to form a salt of the diastereomeric isomer which is then subjected to diastereomeric resolution through the conventional method in the art to obtain the pure enantiomer. In addition, the enantiomer and the diastereoisomer are generally isolated through chromatography which uses a chiral stationary phase and optionally combines with a chemical derivative method (such as carbamate generated from amine).

The compound of the present disclosure may contain an unnatural proportion of atomic isotope at one or more than one atom(s) that constitute the compound. For example, the compound can be radiolabeled with a radioactive isotope, such as tritium ($^{3}H$), iodine-125 ($^{125}I$) or C-14 ($^{14}C$). All isotopic variations of the compound of the present disclosure, whether radioactive or not, are encompassed within the scope of the present disclosure.

The term "pharmaceutically acceptable carrier" refers to any formulation or carrier medium capable of delivering an effective amount of the active substance of the present disclosure, without interfering with the biological activity of the active substance, and without toxic side effects to the host or patient. Representative carriers include water, oils, vegetables and minerals, cream bases, lotion bases, ointment bases and the like. These bases include suspending agents, tackifiers, penetration enhancers and the like. For additional information on carriers, see Remington: The Science and Practice of Pharmacy, 21st Ed., Lippincott, Williams & Wilkins (2005), the contents of which are incorporated herein by reference.

The term "excipient" generally refers to the carrier, diluent and/or medium required to formulate an effective pharmaceutical composition.

For drugs or pharmacological active agents, the term "effective amount" or "therapeutic effective amount" refers to the sufficient amount of non-toxic drugs or agents that can achieve the desired effect. For oral dosage forms of the present disclosure, an "effective amount" of one active substance in a composition refers to the amount required to achieve the desired effect when used in combination with another active substance in the composition. The determination of the effective amount varies from person to person, depends on the age and general condition of the recipient, and also depends on the specific active substance, and the appropriate effective amount in individual cases may be determined by those skilled in the art based on routine experiments.

The terms "active ingredient", "therapeutic agent", "active substance" or "active agent" refer to a chemical entity that is effective in treating a target disorder, disease or condition.

The structure of the compounds of the present disclosure can be confirmed by conventional methods known to those skilled in the art, and if the disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/ω scan, and after collecting the relevant data, the crystal structure can be further analyzed by direct method (Shelxs97).

The solvent used in the present disclosure is commercially available.

The Present Disclosure Adopts the Following Abbreviations:

CRE bacteria are carbapenem-resistant Enterobacteriaceae, and CSE bacteria are carbapenem-susceptible Enterobacteriaceae.

aq stands for water; min stands for minute; FA stands for formic acid; m-CPBA stands for 3-chloroperoxybenzoic acid; eq stands for equivalent; DCC stands for N,N'-dicyclohexylcarbodiimide; DCM stands for dichloromethane; PE stands for petroleum ether; DIAD stands for diisopropyl azodiformate; DMF stands for N,N-dimethylformamide; $BH_3 \cdot SMe_2$ stands for borane dimethyl sulfide; DMSO stands for dimethyl sulfoxide; EtOAc stands for ethyl acetate;

EtOH stands for ethanol; MeOH stands for methanol; Cbz stands for benzyloxycarbonyl, an amine protecting group; Boc stands for tert-butoxycarbonyl, an amine protecting group; HOAc stands for acetic acid; ACN stands for acetonitrile; BH₃ stands for sodium cyanoborohydride; r.t. stands for room temperature; THF stands for tetrahydrofuran; Boc₂O stands for di-tert-butyl dicarbonate; TFA stands for trifluoroacetic acid; DIPEA stands for diisopropylethylamine; SOCl₂ stands for thionyl chloride; iPrOH stands for 2-propanol; mp stands for melting point; LDA stands for lithium diisopropylamide; TEMPO stands for 2,2,6,6-tetramethylpiperidinyloxy free radical or 2,2,6,6-tetramethylpiperidine oxide; NaClO stands for sodium hypochlorite; NaClO₂ stands for sodium chlorite; HOBt stands for 1-hydroxybenzotriazole; psi stands for pounds per square inch; DMF·SO₃ stands for N,N-dimethylformamide sulfur trioxide; KH₂PO₄ stands for potassium dihydrogen phosphate; Bu₄HSO₄ stands for tetrabutylammonium hydrogen sulfate; PPh₃ stands for triphenylphosphine; NH₂NH₂H₂O stands for hydrazine hydrate; DPPF stands for 1,1'-bis(diphenylphosphino)ferrocene; Pd₂(dba)₃ stands for tris(dibenzylideneacetone)dipalladium(0); MIC stands for minimum inhibitory concentration; DMAP stands for 4-dimethylaminopyridine; BnBr stands for (bromomethyl)benzene; H₂O₂ stands for hydrogen peroxide.

BRIEF DESCRIPTION OF THE DRAWINGS

FIG. 1 shows the number of pulmonary bacterial load of immunosuppressive mice treated with compounds.

DETAILED DESCRIPTION OF THE PREFERRED EMBODIMENT

The present disclosure will be specifically described below by way of embodiments, but the scope of the present disclosure is not limited thereto. The present disclosure has been described in detail herein, wherein specific embodiments thereof are also disclosed, for those skilled in the art, it is obvious that various changes and improvements can be made to the specific embodiments of the present disclosure without departing from the spirit and scope of the present disclosure.
Key Intermediate A1:

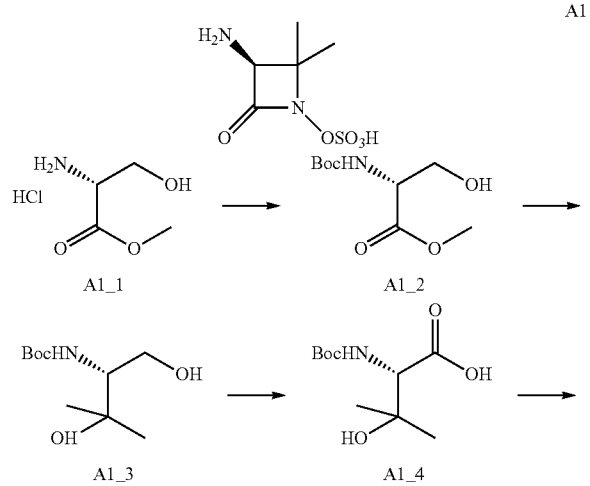

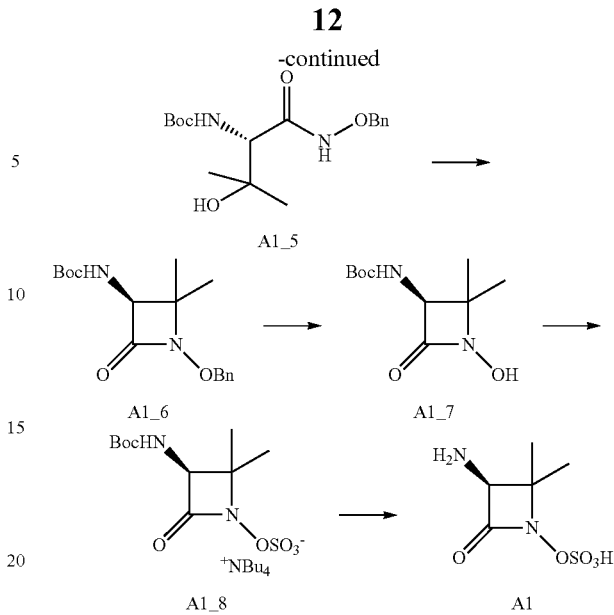

Step 1: Compound A1_1 (100.00 g, 642.76 mmol, 1.00 eq) was added to THF (1.50 L), then triethylamine (136.59 g, 1.35 mol, 187.10 mL, 2.10 eq) was added thereto, and the mixture was cooled to 0° C., and then a solution of Boc₂O (154.31 g, 707.03 mmol, 162.43 mL, 1.10 eq) in THF (500.00 mL) was added dropwise at this temperature; the reaction mixture was warmed to 10° C. and stirred at this temperature for 10 hours, then the reaction mixture was filtered, and the filtrate was concentrated under reduced pressure to obtain the crude product, and saturated sodium bicarbonate solution (300 mL) was added to the obtained crude product, then extracted with ethyl acetate (500 mL*2). The combined organic layers were dried over anhydrous sodium sulfate, filtered and concentrated under reduced pressure to obtain compound A1_2.

¹H NMR (400 MHz, CDCl₃) δ (ppm): 5.51 (br s, 1H), 4.46-4.31 (m, 1H), 4.03-3.86 (m, 2H), 3.83-3.72 (m, 3H), 2.64 (br s, 1H), 1.46 (s, 9H).

Step 2: A1_2 was dissolved in THF (2000 mL), cooled to −50° C. and stirred for 10 minutes, then MeMgBr (3 M, 638.59 mL, 6.00 eq) was added dropwise at −50° C. for 20 minutes. The obtained mixture was stirred at 25° C. for 60 minutes, then hydrochloric acid (2000 mL, 0.5 M) was added to quench the reaction at 0° C., and the obtained mixture was extracted with ethyl acetate (500 mL*2). The combined organic layers were washed with saturated aqueous sodium chloride solution, dried over anhydrous sodium sulfate, filtered; the filtrate was concentrated under reduced pressure, and the obtained crude product was stirred and washed with petroleum ether/ethyl acetate (70 mL, 10/1) and purified by column chromatography (SiO₂, petroleum ether/ethyl acetate=10/1 to 1/1 (v/v)) to obtain compound A1_3.

¹H NMR (400 MHz, CDCl₃) δ (ppm): 5.41-5.23 (m, 1H), 3.96 (br d, J=11.2 Hz, 1H), 3.79-3.70 (m, 1H), 3.40 (br d, J=8.3 Hz, 1H), 2.53-2.39 (m, 2H), 1.39 (s, 9H), 1.28 (s, 3H), 1.18 (s, 3H).

Step 3: A1_3 (30 g, 136.81 mmol, 1.00 eq) was dissovled in a mixed solution of sodium phosphate buffer (540.00 mL, 0.7 M, 2.76 eq) and acetonitrile (300 mL), then TEMPO (2.15 g, 13.68 mmol, 0.10 eq) was added thereto; the reaction mixture was stirred at 35° C. and a solution of NaClO (81.47 g, 5.47 mmol, 67.33 mL, 0.5% purity, 0.04 eq) and NaClO (98.99 g, 1.09 mol, 8.00 eq) in water (300 mL) was added dropwise. The obtained mixture was stirred at 35° C. for 12 hours, then cooled to room temperature and citric acid (10 g) was added thereto. The obtained mixture was extracted with ethyl acetate (500 mL*4), and the combined organic layers were washed with saturated aqueous sodium chloride solution (100 mL), dried over anhydrous sodium sulfate, filtered, and the filtrate was concentrated under reduced pressure. Aqueous sodium carbonate solution (300 mL, 2 M) was added to the obtained crude product, then the obtained mixture was washed with ethyl acetate (200 mL*2). The aqueous layer was cooled to 0° C. and the pH of the aqueous layer was adjusted to 3.0 with dilute hydrochloric acid (1 M). Sodium chloride was then added to the aqueous solution to saturation, and the obtained mixture was extracted with ethyl acetate (500 mL*4). The combined organic layers were washed with saturated aqueous sodium chloride solution (50 mL), dried over anhydrous sodium sulfate, filtered, and the filtrate was concentrated under reduced pressure to obtain compound A1_4.

$^1$H NMR (400 MHz, CDCl$_3$) δ (ppm): 5.42 (br d, J=7.8 Hz, 1H), 4.18 (br d, J=8.4 Hz, 1H), 1.39 (s, 9H), 1.30 (s, 3H), 1.22 (s, 3H).

Step 4: A1_4 (48 g, 205.78 mmol, 1.00 eq) was dissolved in DMF (700 mL), then DCC (84.92 g, 411.56 mmol, 83.25 mL, 2.00 eq) and HOBt (55.61 g, 411.56 mmol, 2 eq) were added thereto; the mixture was stirred at 10° C. for 0.5 hours, then O-benzylhydroxylamine hydrochloride (39.41 g, 246.93 mmol, 1.20 eq) and aqueous sodium bicarbonate solution (69.15 g, 823.11 mmol, 32.01 mL, 4 eq) were added thereto. The obtained mixture was stirred at 10° C. for 1.5 hours, then the reaction mixture was filtered and the filtrate was concentrated under reduced pressure. The crude product was diluted with water (400 mL) and extracted with ethyl acetate (500 mL*2). The combined organic layers were washed with saturated aqueous sodium chloride solution, dried over anhydrous sodium sulfate and filtered. The filtrate was concentrated under reduced pressure, and the obtained residue was purified by column chromatography (SiO$_2$, petroleum ether/ethyl acetate=6/1 to 3/1 (v/v)) to obtain compound A1_5.

$^1$H NMR (400 MHz, DMSO-d$_6$) δ (ppm): 11.06 (s, 1H), 7.45-7.32 (m, 5H), 6.45 (br d, J=9.2 Hz, 1H), 4.80 (d, J=2.6 Hz, 2H), 4.65 (s, 1H), 4.04 (d, J=7.0 Hz, 1H), 3.77 (br d, J=9.2 Hz, 1H), 1.40 (s, 9H), 1.11 (s, 3H), 1.08 (s, 3H);

LC-MS (ESI) m/z: 283 (M−56+1).

Step 5: A1_5 (57 g, 168.44 mmol, 1 eq) was dissolved in pyridine (600 mL), stirred at 55° C. for 12 hours, then sulfur trioxide pyridine (187.67 g, 1.18 mol, 7 eq) was added thereto. The reaction mixture was then concentrated under reduced pressure and the obtained solid was dissolved in ethyl acetate (800 mL). An aqueous potassium carbonate solution (816.94 mL, 2 M, 9.7 eq) was added dropwise to the solid at 0° C., and the obtained mixture was stirred at 100° C. for 2 hours. The reaction mixture was then cooled to room temperature and extracted with ethyl acetate (400 mL*3). The combined organic layers were dried over anhydrous sodium sulfate, filtered and the filtrate was concentrated under reduced pressure. The obtained crude product was purified by column chromatography (SiO$_2$, petroleum ether/ethyl acetate=12/1 to 9/1 (v/v)) to obtain compound A1_6.

$^1$H NMR (400 MHz, CDCl$_3$) δ (ppm): 7.41 (br d, J=1.0 Hz, 5H), 5.02-4.97 (m, 2H), 4.32 (d, J=6.7 Hz, 1H), 1.50-1.43 (m, 9H), 1.34 (s, 3H), 1.11 (s, 3H);

LC-MS (ESI) m/z: 321.1 (M+1).

Step 6: A1_6 (31 g, 96.76 mmol, 1.00 eq) was dissolved in methanol (620 mL), and Pd/C (3 g, 10%) was added thereto under nitrogen atmosphere, and then the reaction flask was purged with nitrogen three times. The reaction flask was then charged with hydrogen at 20° C. and the reaction was conducted under 50 psi atmosphere for 1 hour, then the reaction mixture was filtered and the filtrate was concentrated under reduced pressure to obtain compound A1_7.

Step 7: DMF·SO$_3$ (17.56 g, 114.65 mmol, 1.2 eq) was added to a solution of A1_7 (22 g, 95.54 mmol, 1.00 eq) in DMF (220 mL). The mixture was stirred at 0° C. for 1 hour, then diluted with saturated KH$_2$PO$_4$ (200 mL). Then the obtained mixture was extracted with ethyl acetate (100 mL), and Bu$_4$HSO$_4$ (38.93 g, 114.65 mmol, 1.20 eq) was added to the combined aqueous layers at 10° C. for 20 min, then the obtained aqueous phase was extracted with EtOAc (350 mL*4). The organic phases were combined and concentrated under reduced pressure to obtain compound A1_8.

Step 8: A1_8 (68 g, 123.24 mmol, 1.00 eq) was added to trifluoroacetic acid (300 mL), and the mixture was stirred at 15° C. under nitrogen atmosphere for 4 hours. The reaction mixture was diluted with dichloromethane (350 mL) then filtered, and the filtrate was concentrated under reduced pressure to obtain compound A1.

$^1$H NMR (400 MHz, DMSO-d$_6$) δ (ppm): 8.79 (br s, 3H), 4.18 (br s, 1H), 1.46-1.38 (m, 6H).

Key Intermediate A2:

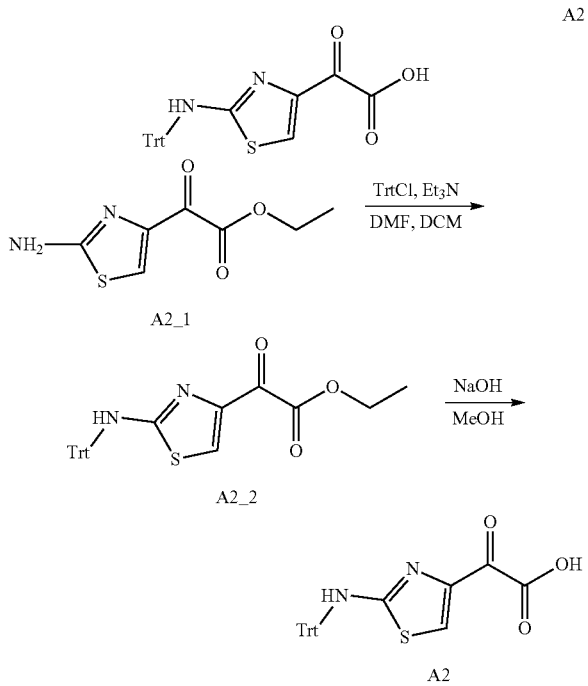

Step 1: A2_1 (97 g, 484.48 mmol, 1 eq) was dissolved in dichloromethane (600 mL) and DMF (400 mL), then triethylamine (49.02 g, 484.48 mmol, 67.43 mL, 1 eq) was added dropwise to this solution, then the solution was cooled to −30° C. and triphenylchloromethane (135.06 g, 484.48 mmol, 1 eq) was added dropwise at this temperature. The obtained reaction mixture was stirred at 15° C. for 12 hours, then the reaction mixture was diluted with water (500 mL) and extracted with ethyl acetate (500 mL*2); the combined organic layers were washed with dilute hydrochloric acid (100 mL, 0.1 M), dried over anhydrous sodium sulfate, then filtered, and the filtrate was concentrated under reduced pressure to obtain A2_2.

Step 2: Sodium hydroxide (24.86 g, 621.43 mmol, 1.1 eq) was added to a solution of A2_2 (250 g, 564.94 mmol, 1 eq) in methanol (750 mL). The obtained mixture was stirred at 60° C. for 10 mins, then the reaction mixture was filtered and the obtained solid was dissolved in water (500 mL) and dilute hydrochloric acid (500 mL, 1 M) was added to adjust the pH<5 with the precipitation occurring. The mixture was filtered and the obtained solid was dissolved in dichloromethane (5 L); the obtained solution was dried over anhydrous sodium sulfate, filtered, and the filtrate was concentrated under reduced pressure to obtain intermediate A2.

$^1$H NMR (400 MHz, DMSO-$d_6$) δ (ppm): 9.02 (s, 1H), 7.76 (s, 1H), 7.37-7.21 (m, 15H);

LC-MS (ESI) m/z: 437.2 (M+23).

Key Intermediate A4:

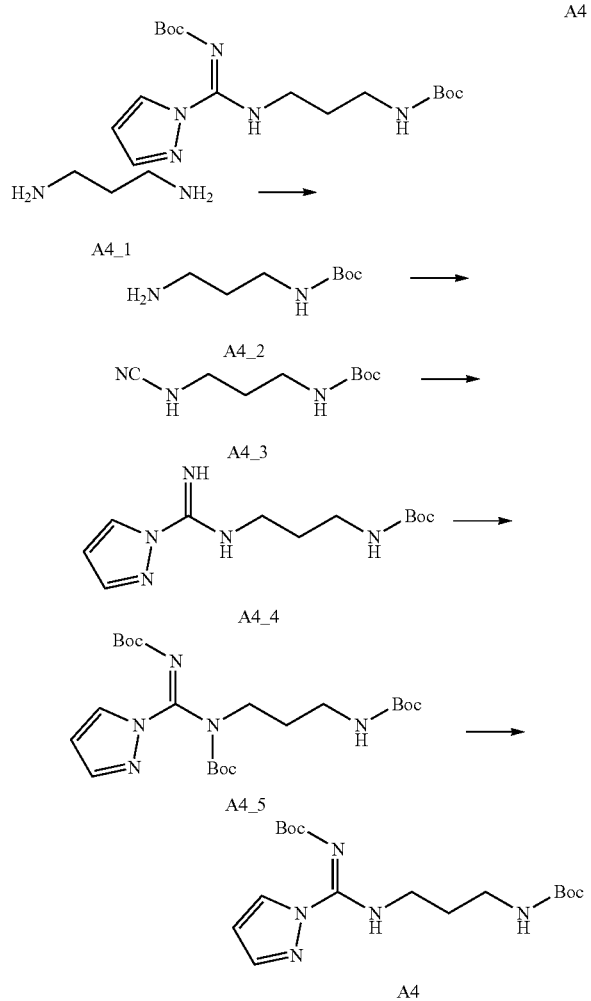

Step 1: A solution of Boc$_2$O (9.32 g, 42.72 mmol, 9.81 mL, 1.00 eq) in dichloromethane (50 mL) was slowly added dropwise to a solution of A4_1 (19.00 g, 256.34 mmol, 21.35 mL, 6.00 eq) in dichloromethane (150 mL) at 0° C. The mixture was stirred at 20° C. for 1 hour and then water (50 mL) was added to quench the reaction; the organic layer was separated and washed with water (30 mL), and the aqueous layer was extracted with dichloromethane (30 mL); the organic phases were combined and dried over anhydrous sodium sulfate, filtered, and the filtrate was concentrated under reduced pressure to obtain compound A4_2.

Step 2: Sodium acetate (7.06 g, 86.08 mmol, 2.00 eq) was added to a solution of A4_2 (7.50 g, 43.04 mmol, 7.50 mL, 1.00 eq) in methanol (75.00 mL) at 0° C., then BrCN (6.84 g, 64.56 mmol, 4.75 mL, 1.50 eq) was added thereto. The mixture was stirred at 20° C. for 1 hour and the reaction was quenched with water (20 mL), then the reaction mixture was extracted with ethyl acetate (20 mL). The combined organic layers were washed with saturated sodium chloride (20 mL*2), dried over anhydrous sodium sulfate, filtered, and the filtrate was concentrated under reduced pressure to obtain compound A4_3.

Step 3: Compound A4_3 (5.50 g, 27.60 mmol, 1.00 eq) and pyrazole hydrochloride (2.89 g, 27.60 mmol, 1.00 eq) were added to 1,4-dioxane (50.00 mL), and the mixture was stirred for 2 hours at 80° C. under nitrogen atmosphere, then a solution of compound A4_4 in 1,4-dioxane was obtained, which was directly used in the next reaction.

Step 4: The solution of the crude product A4_4 (7.38 g, 27.61 mmol, 1.00 eq) in dioxane obtained in the previous step was added to dichloromethane (50.00 mL), then DMAP (674.53 mg, 5.52 mmol, 0.20 eq) and Boc$_2$O (18.08 g, 82.83 mmol, 19.03 mL, 3.00 eq) were added thereto. The mixture was stirred at 20° C. for 12 hours, quenched with water (50 mL), and extracted with ethyl acetate (50 mL*2). The combined organic phases were washed with saturated sodium chloride (30 mL), dried over anhydrous sodium sulfate, filtered, and the filtrate was concentrated under reduced pressure; the residue was purified by column chromatography (SiO$_2$, petroleum ether/ethyl acetate=20:1 to 10:1 (v/v)) to obtain compound A4_5.

$^1$H NMR (400 MHz, CDCl$_3$) δ (ppm): 8.13 (d, J=2.7 Hz, 1H), 7.55 (s, 1H), 6.36-6.28 (m, 1H), 4.89 (br s, 1H), 3.44 (t, J=6.2 Hz, 2H), 3.25-3.14 (m, 2H), 1.87-1.75 (m, 2H), 1.59-1.32 (m, 27H).

Step 5: Compound A4_5 (4.00 g, 8.56 mmol, 1.00 eq) was dissolved in a mixed solution of THF (40.00 mL) and water (10.00 mL), then sodium hydroxide (3.42 g, 85.60 mmol, 10.00 eq) was added thereto; the mixture was stirred at 70° C. for 2 hours under nitrogen protection. The reaction mixture was concentrated and extracted with dichloromethane (20 mL), and the combined organic phases were washed with saturated sodium chloride (10 mL), dried over anhydrous sodium sulfate, filtered, and the filtrate was concentrated under reduced pressure, then the residue was purified by column chromatography (SiO$_2$, petroleum ether/ethyl acetate=10/1 to 5/1 (v/v)) to obtain intermediate A4.

Key Intermediate A5:

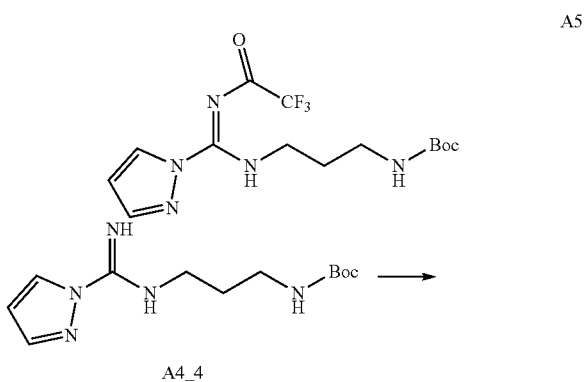

-continued

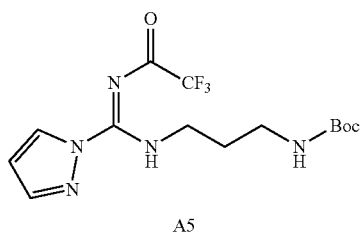

A5

Step 5: Trifluoroacetic anhydride (1.66 g, 7.90 mmol, 1.10 mL, 1.2 eq) and triethylamine (1.47 g, 14.48 mmol, 2.02 mL, 2.2 eq) were added to a solution of compound A4_4 hydrochloride (2 g, 6.58 mmol, 1 eq) in DCM (20 mL). The mixture was stirred at 10° C. for 1 hour. The reaction mixture was washed with water (20 mL*2), and the organic layer was concentrated under reduced pressure to obtain intermediate A5.

Key Intermediate A6

-continued

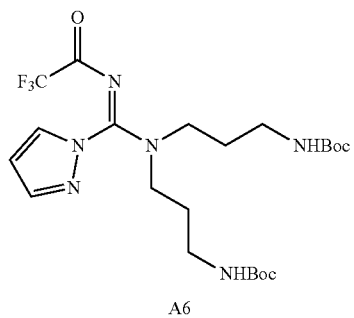

A6

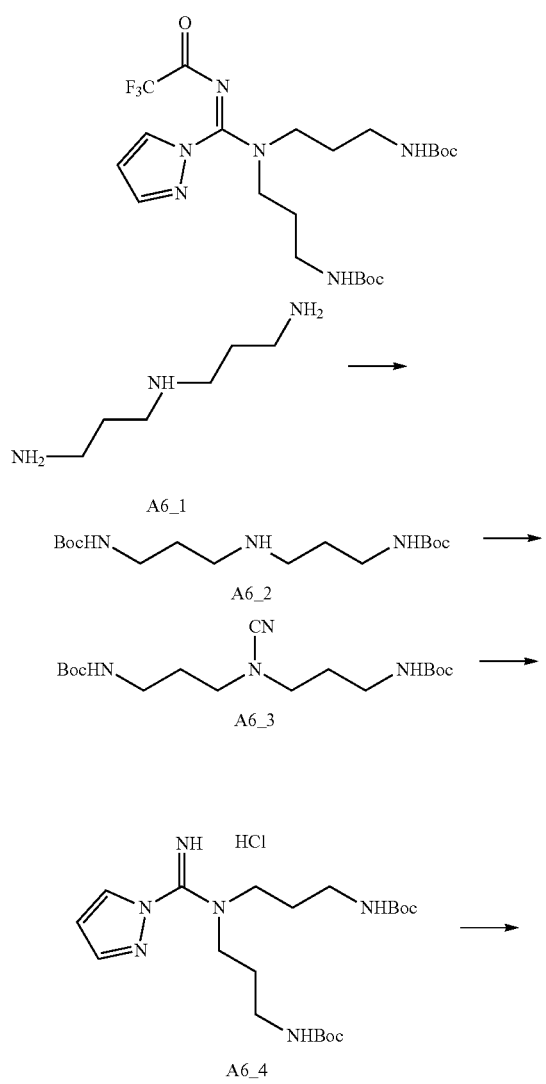

Step 1: A solution of BOC-ONB (29.80 g, 106.69 mmol, 2 eq) and Et₃N (11.34 g, 112.03 mmol, 15.59 mL, 2.1 eq) in THF (330 mL) was slowly added dropwise to a solution of A6_1 (7 g, 53.35 mmol, 7.54 mL, 1 eq) in THF (70 mL) at 20° C., and the obtained mixture was stirred at 20° C. for 11 hours. The reaction mixture was filtered and the filtrate was concentrated under reduced pressure, and the obtained residue was diluted with potassium carbonate solution (100 mL, 2 M) and extracted with ethyl acetate (100 mL*2); the organic phases were combined and concentrated under reduced pressure to obtain compound A6_2.

Step 2: BrCN (7.86 g, 74.21 mmol, 5.46 mL, 1.64 eq) and sodium acetate (7.43 g, 90.51 mmol, 2 eq) were added to a solution of A6_2 (15 g, 45.26 mmol, 1 eq) in MeOH (150 mL) at 0° C., and the mixture was stirred at room temperature for 2 hours and then diluted with saturated aqueous sodium carbonate solution (300 mL) and extracted with ethyl acetate (100 mL). The organic phase was concentrated under reduced pressure, and the residue was purified by column chromatography (SiO₂, petroleum ether/ethyl acetate=5/1 to 1/1) to obtain compound A6_3.

Step 3: Compound A6_3 (4.2 g, 11.78 mmol, 1 eq) and pyrazole hydrochloride (1.23 g, 11.78 mmol, 1 eq) were respectively added to THF (40 mL) and purged with nitrogen three times, then the reaction mixture was heated to 75° C. and stirred for 12 hours. The reaction mixture was cooled to room temperature, diluted with ethyl acetate (100 mL), filtered to collect the filter cake, and the filter cake was dried to obtain compound A6_4.

LCMS (ESI) m/z: 425.4 (M+1).

Step 4: TFAA (765.41 mg, 3.64 mmol, 506.89 μL, 0.8 eq) and triethylamine (1.01 g, 10.02 mmol, 1.39 mL, 2.2 eq) were added to a solution of compound A6_4 (2.1 g, 4.56 mmol, 1 eq) in DCM (20 mL) at 0° C., and the mixture was stirred at 0° C. for 20 minutes and then diluted with water (20 mL), and the obtained mixture was extracted with DCM (50 mL*2); the organic layers were combined and concentrated under reduced pressure to obtain compound A6.

Key Intermediate A8:

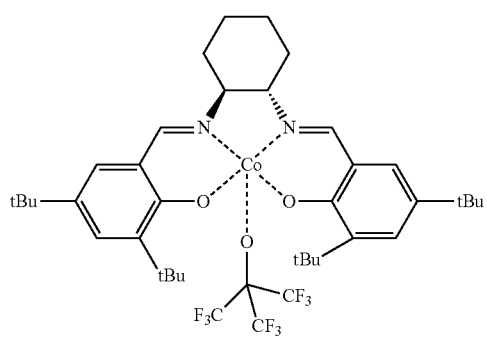

A8

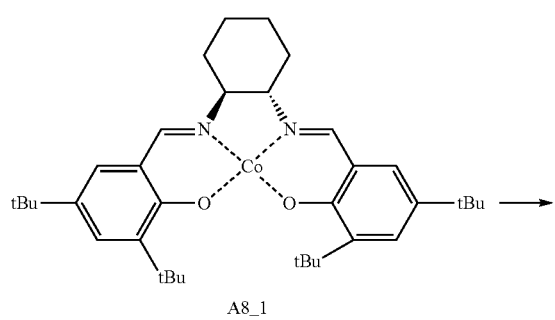

A8_1

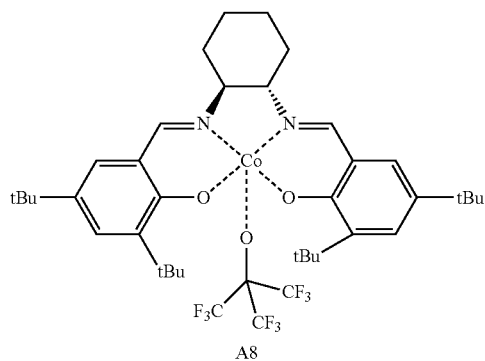

A8

Step 1: Compound A8_1 was added to a mixed solution of 1,1,1,3,3,3-hexafluoro-2-(trifluoromethyl)propan-2-ol (10.16 g, 43.06 mmol, 10 eq) and DCM (20 mL), and the reaction mixture was stirred at room temperature for 45 minutes (20 to 25° C.) and then concentrated under reduced pressure to obtain compound A8.

Key Intermediate A10:

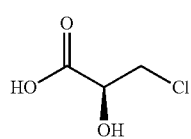

A10

Synthetic Route:

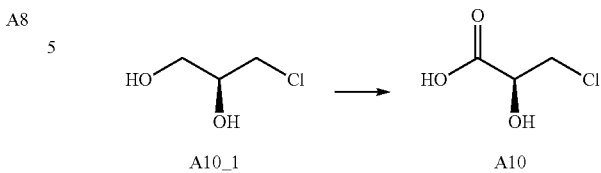

Step 1: A10_1 (100 g, 904.66 mmol, 1 eq) was added to water (100 mL), and the mixture was heated to about 80° C., then concentrated HNO₃ (294.00 g, 3.03 mol, 210 mL, 65% purity, 3.35 eq) was added dropwise thereto; after the completion of addition, the mixture was stirred at 120° C. for 4 hours, then the mixture was cooled to 0 to 5° C.; sodium bicarbonate (58 g) was added to the mixture in portions, then the mixture was extracted with ethyl acetate (300 mL*4), and the combined organic phases were concentrated under reduced pressure, then dichloromethane (300 mL) was added to the residue; the mixture was stirred for about 1 hour, filtered, and the solid was collected, then dichloromethane (300 mL) was added to the obtained white solid; the mixture was stirred for about 1 hour, filtered, and the solid was collected to obtain compound A10.

Key Intermediate A11:

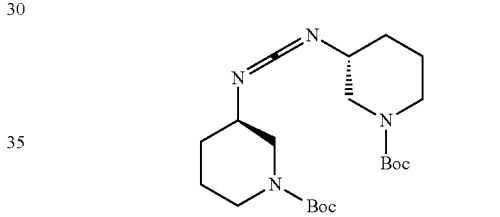

A11

Synthetic Route:

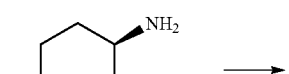

41_1

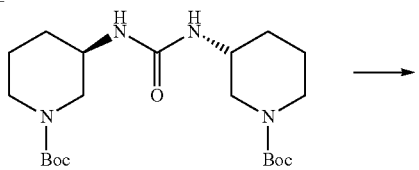

A11_1

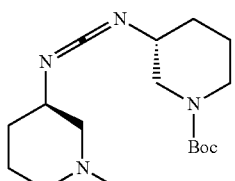

A11

Step 1: Compound 41_1 (20 g, 99.86 mmol, 1 eq) was added to a solution of carbonyldiimidazole (8.10 g, 49.93 mmol, 0.5 eq) in dichloromethane (200 mL). The mixture was stirred at 25° C. for 12 hours, then water (150 mL) was added to the reaction mixture to quench the reaction, and the mixture was extracted with dichloromethane (50 mL), then the combined organic layer was concentrated under reduced pressure, and the obtained residue was stirred and washed with petroleum ether/ethyl acetate (50 mL, 1/1), filtered, and the solid was collected to obtain compound A11_1. LCMS (ESI) m/z: 427.2 (M+1).

Step 2: Trifluorosulfonic anhydride (16.73 g, 59.31 mmol, 9.79 mL, 1.1 eq) and diisopropylamine (15.33 g, 118.63 mmol, 20.66 mL, 2.2 eq) were added to a solution of compound 46_1 (23 g, 53.92 mmol, 21.05 mL, 1 eq) in dichloromethane (200 mL). The mixture was stirred at 15° C. for 0.5 hours and then concentrated under reduced pressure, and the obtained residue was purified by column chromatography (SiO$_2$, petroleum ether/ethyl acetate=1/0 to 8/1) to obtain compound A11.

Reference Embodiment 1: Compound 13

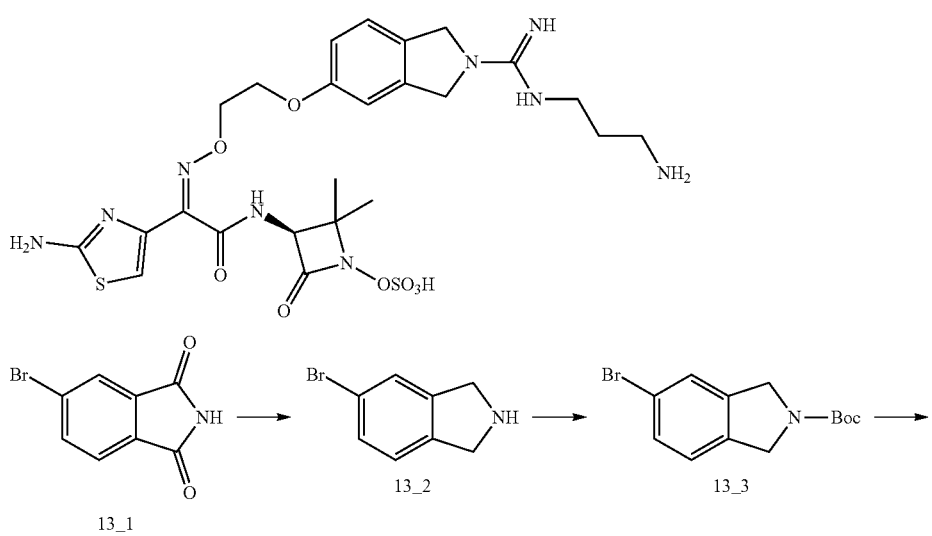

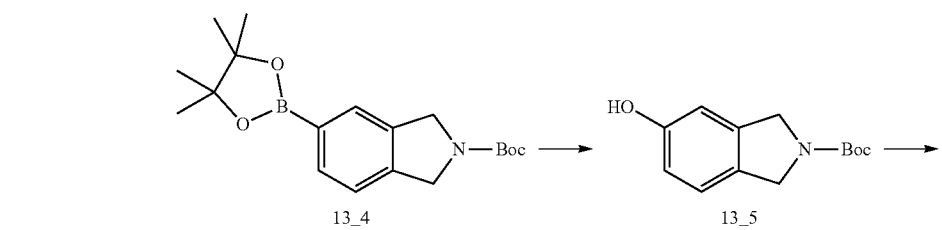

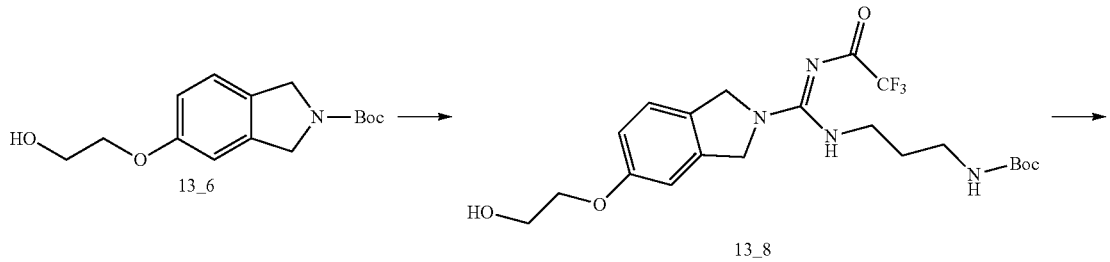

-continued
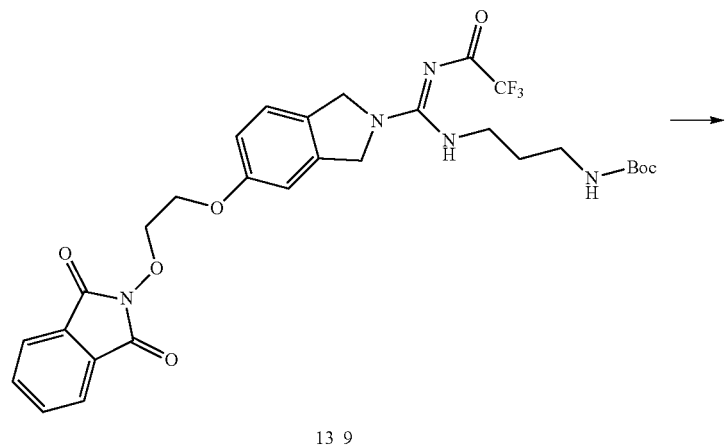
13_9
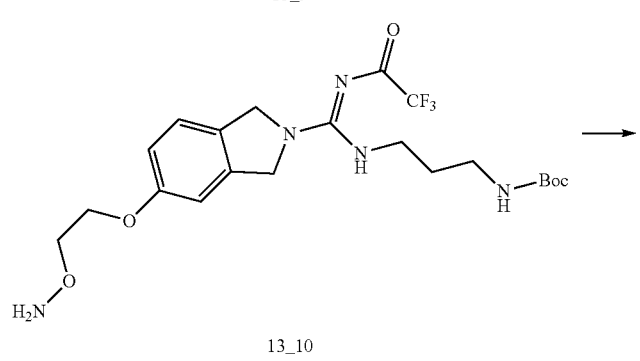
13_10
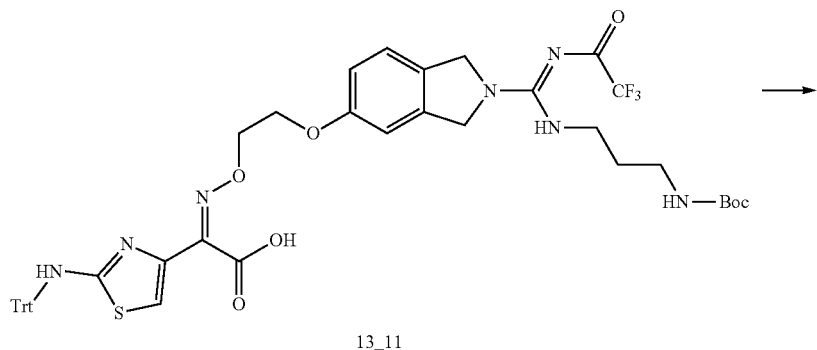
13_11
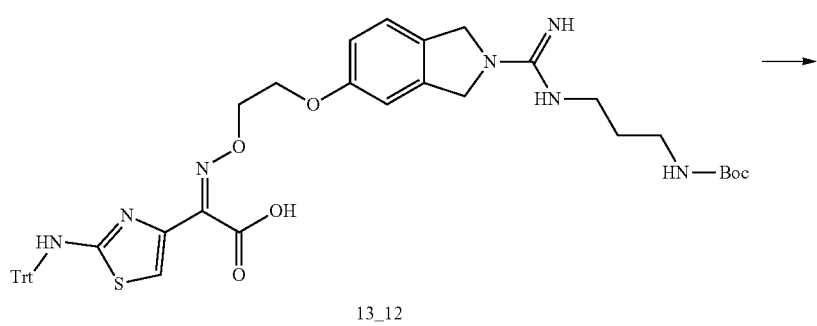
13_12

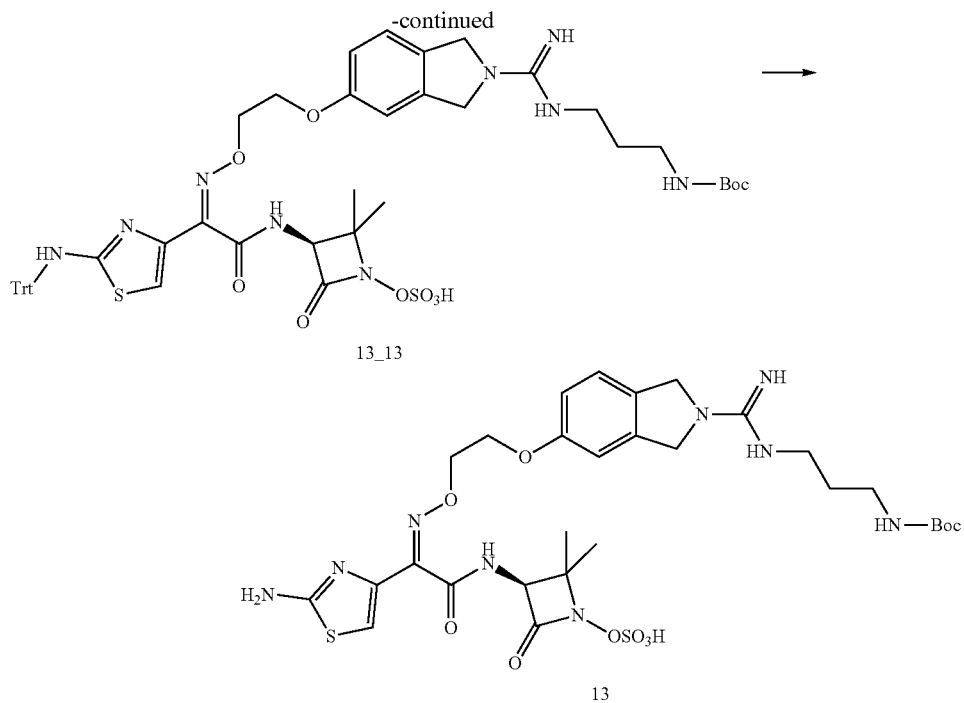

Step 1: BH₃·SMe₂ (10 M, 38.49 mL, 3 eq) was added to a solution of compound 13_1 (29 g, 128.30 mmol, 1 eq) in THF (300 mL). The mixture was reacted at 80° C. for 12 hours, then the mixture was cooled to 0° C. and quenched with methanol (100 mL). Dilute hydrochloric acid (90 mL, 1 M) was then added thereto, and the mixture was stirred at 80° C. for 1 hour and concentrated under reduced pressure to remove the solvent. The residue was diluted with water (100 mL) and extracted with ethyl acetate (150 mL*2). The pH of the aqueous layer was then adjusted to 10-11 with aqueous sodium hydroxide solution (1 M), and the obtained aqueous phase was extracted with ethyl acetate (150 mL*2). The combined organic layers were dried over anhydrous sodium sulfate, filtered and concentrated under reduced pressure to obtain compound 13_2.

Step 2: Boc₂O (6.61 g, 30.29 mmol, 6.96 mL, 1 eq) and triethylamine (6.13 g, 60.59 mmol, 8.43 mL, 2 eq) were added to a solution of compound 13_2 (6 g, 30.29 mmol, 1 eq) in dichloromethane (50 mL). The mixture was stirred at 20° C. for 12 hours and concentrated under reduced pressure to remove the solvent. The residue was diluted with water (100 mL) and extracted with ethyl acetate (50 mL*3). The combined organic layers were concentrated under reduced pressure, and the residue was purified by column chromatography (SiO₂, petroleum ether/ethyl acetate=1/0 to 10/1 (v/v)) to obtain compound 13_3.

Step 3: Pd(dppf)Cl₂·CH₂Cl₂ (2.46 g, 3.02 mmol, 0.1 eq) and potassium acetate (11.85 g, 120.73 mmol, 4 eq) were added to a solution of compound 13_3 (9 g, 30.18 mmol, 1 eq) and 4,4,4',4',5,5,5',5'-octamethyl-2,2'-bis(1,3,2-dioxaborolane) (15.33 g, 60.37 mmol, 2 eq) in DMSO (150 mL). The mixture was purged with nitrogen three times and stirred at 90° C. for 12 hours. The reaction mixture was diluted with water (200 mL) and extracted with ethyl acetate (150 mL*3). The combined organic layers were filtered and the filtrate was concentrated under reduced pressure, and the residue was purified by column chromatography (SiO₂, petroleum ether/ethyl acetate=100/1 to 20/1 (v/v)) to obtain compound 13_4.

Step 4: H₂O₂ (86.69 g, 764.69 mmol, 73.47 mL, 30% purity, 24 eq) and acetic acid (9.95 g, 165.68 mmol, 9.48 mL, 5.2 eq) were added to a solution of compound 13_4 (11 g, 31.86 mmol, 1 eq) in THF (100 mL). The mixture was stirred at 20° C. for 12 hours and then quenched with saturated sodium carbonate (30 mL), and the obtained mixture was diluted with water (10 mL) and extracted with ethyl acetate (20 mL*2). The combined organic layers were concentrated under reduced pressure, and the residue was purified by column chromatography (SiO₂, petroleum ether/ethyl acetate=15/1 to 7/1 (v/v)) to obtain compound 13_5. LC-MS (ESI) m/z: 180 (M−56+1). ¹H NMR (400 MHz, DMSO-d₆) δ (ppm): 7.09 (t, J=6.3 Hz, 1H), 6.72-6.65 (m, 2H), 4.47 (br t, J=12.7 Hz, 4H), 1.45 (s, 9H).

Step 5: Potassium carbonate (2.58 g, 18.70 mmol, 1.1 eq) and 1,3-dioxolan-2-one (4 g, 17.00 mmol, 1 eq) were added to a solution of compound 13_5 (2.25 g, 25.50 mmol, 1.70 mL, 1.5 eq) in DMF (30 mL). The mixture was stirred at 150° C. for 1 hour and concentrated under reduced pressure, and the residue was diluted with water (50 mL) and extracted with ethyl acetate (50 mL*2). The organic layers were combined and concentrated under reduced pressure, and the residue was purified by column chromatography (SiO₂, petroleum ether/ethyl acetate=7/1 to 3/1 (v/v)) to obtain compound 13_6. ¹H NMR (400 MHz, DMSO-d₆) δ (ppm): 7.21 (dd, J=5.9, 8.0 Hz, 1H), 6.91 (d, J=5.5 Hz, 1H), 6.85 (d, J=8.6 Hz, 1H), 4.87 (t, J=5.5 Hz, 1H), 4.56-4.46 (m, 5H), 3.99-3.93 (m, 2H), 3.70 (q, J=5.3 Hz, 2H), 1.45 (s, 9H).

Step 6: TFA (6.16 g, 54.02 mmol, 4 mL, 12.58 eq) was added to a solution of compound 13_6 (1.2 g, 4.30 mmol, 1 eq) in dichloromethane (5 mL). The mixture was stirred at 10° C. for 1 hour and concentrated under reduced pressure, and the residue was diluted with methanol (5 mL) and added dropwise to a solution of hydrogen chloride in ethyl acetate (4 M, 15 mL) at −10° C. for 10 minutes, then the mixture was filtered and the filter cake was collected and dried, added to a mixture of methanol (10 mL) and potassium carbonate (1.19 g, 8.59 mmol, 2 eq); the reaction was conducted at 15° C. for two hours, filtered, and the filtrate was concentrated under reduced pressure to obtain compound 13_7.

Step 7: Compound 13_7 (0.3 g, 1.67 mmol, 1 eq) and intermediate A5 (608.21 mg, 1.67 mmol, 1 eq) were dissolved in DMF (10 mL), and the mixture was stirred at 10° C. for 0.5 hours, then diluted with water (50 mL) and extracted with ethyl acetate (50 mL*2). The combined organic layers were washed with saturated sodium chloride (20 mL*2), dried over anhydrous sodium sulfate, filtered and concentrated under reduced pressure, and the residue was purified by column chromatography (SiO$_2$, DCM/MeOH=50/1 to 20/1 (v/v)) to obtain compound 13_8. LC-MS (ESI) m/z: 475.3 (M+1).

Step 8: 2-Hydroxyisoindoline-1,3-dione (104.52 mg, 640.71 μmol, 0.95 eq) and compound 13_8 (320 mg, 674.43 mmol, 1 eq) were dissolved in THF (5 mL), then PPh$_3$ (212.27 mg, 809.32 μmol, 1.2 eq) and DIAD (163.65 mg, 809.32 μmol, 157.36 μL, 1.2 eq) were added thereto. The mixture was stirred at 20° C. for 0.5 hours and then concentrated under reduced pressure to remove the solvent, and the residue was diluted with water (50 mL) and extracted with ethyl acetate (50 mL*2). The organic layers were combined, concentrated under reduced pressure to remove the solvent, and the residue was purified by column chromatography (SiO$_2$, petroleum ether/ethyl acetate=2/1 to 1/3 (v/v)) to obtain compound 13_9. LC-MS (ESI) m/z: 620.3 (M+1).

Step 9: NH$_2$NH$_2$H$_2$O (41.82 mg, 710.15 μmol, 40.61 μL, 85% purity, 1.1 eq) was added to a solution of compound 13_9 (0.4 g, 645.59 μmol, 1 eq) in ethanol (5 mL) and dichloromethane (1 mL). The mixture was stirred at 15° C. for 10 minutes, diluted with water (20 mL) and extracted with ethyl acetate (20 mL*3). The organic layers were combined, filtered and concentrated under reduced pressure to obtain compound 13_10. LC-MS (ESI) m/z: 490.3 (M+1).

Step 10: Compound 13_10 (0.3 g, 612.89 μmol, 1 eq) was added to a solution of intermediate A2 (203.22 mg, 490.31 μmol, 0.8 eq) in dichloromethane (2 mL) and ethanol (5 mL). The mixture was stirred at 15° C. for 10 minutes and concentrated under reduced pressure to obtain compound 13_11. LC-MS (ESI) m/z: 886.4 (M+1).

Step 11: Potassium carbonate (156.00 mg, 1.13 mmol, 2 eq) was added to a solution of compound 13_11 (0.5 g, 564.37 μmol, 1 eq) in methanol (5 mL) and water (0.1 mL), and the mixture was stirred at 15° C. for 24 hours, and then diluted with dilute hydrochloric acid (20 mL, 0.1 M), extracted with dichloromethane (50 mL*2). The organic layers were combined and washed with saturated sodium chloride (10 mL*2), dried over anhydrous sodium sulfate, filtered and concentrated under reduced pressure, and the residue was purified by column chromatography (SiO$_2$, DCM/MeOH=10/1 to 0/1 (v/v)) to obtain compound 13_12. LC-MS (ESI) m/z: 790.4 (M+1).

Step 12: HOBt (102.63 mg, 759.55 μmol, 2 eq) and DCC (156.72 mg, 759.55 μmol, 153.64 μL, 2 eq) were added to a solution of compound 13_12 (0.3 g, 379.77 μmol, 1 eq) in DMF (4 mL). The mixture was stirred at room temperature for 0.5 hours, and then intermediate A1 (103.78 mg, 493.71 μmol, 1.3 eq) and sodium bicarbonate (127.62 mg, 1.52 mmol, 59.08 μL, 4 eq) were added. The obtained mixture was stirred at 15° C. for 11.5 hours, filtered and concentrated under reduced pressure, and the residue was purified by preparative TLC (SiO$_2$, DCM/MeOH=8/1 (v/v)) to obtain compound 13_13. LC-MS (ESI) m/z: 983.6 (M+1)

Step 13: TFA (1.54 g, 13.51 mmol, 1 mL, 73.69 eq) was added to a solution of compound 13_13 (180 mg, 183.27 μmol, 1 eq) in dichloromethane (1 mL). After the mixture was stirred at 0° C. for 10 mins, the reaction mixture was diluted with petroleum ether/ethyl acetate (10 mL, 1/1), filtered under reduced pressure and the filter cake was dried, purified by preparative HPLC (column: Boston Green ODS 150*30 5 u; mobile phase: [water (0.225% formic acid)-acetonitrile]; acetonitrile %: 2%-32%, 10 min) to obtain compound 13. $^1$H NMR (400 MHz, DMSO-d$_6$+D$_2$O) δ (ppm): 8.34 (s, 1H), 7.33-7.24 (m, 1H), 7.06-6.89 (m, 2H), 6.76 (s, 1H), 4.76-4.57 (m, 5H), 4.38 (br s, 2H), 4.20-4.15 (m, 1H), 3.36-3.23 (m, 2H), 2.85 (br t, J=7.5 Hz, 2H), 1.80 (br s, 2H), 1.37 (s, 3H), 1.17 (s, 3H); LC-MS (ESI) m/z: 640.4 (M+1).

Embodiment 1: Compound 32

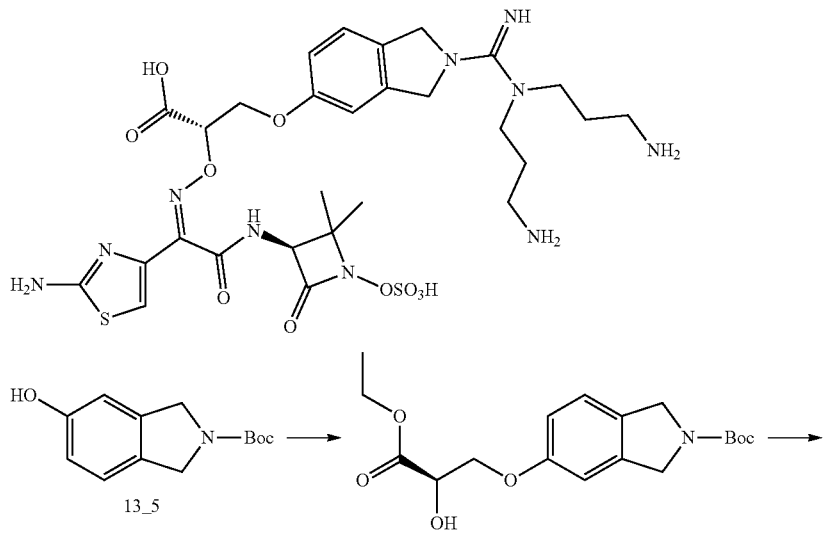

32

32_1

-continued
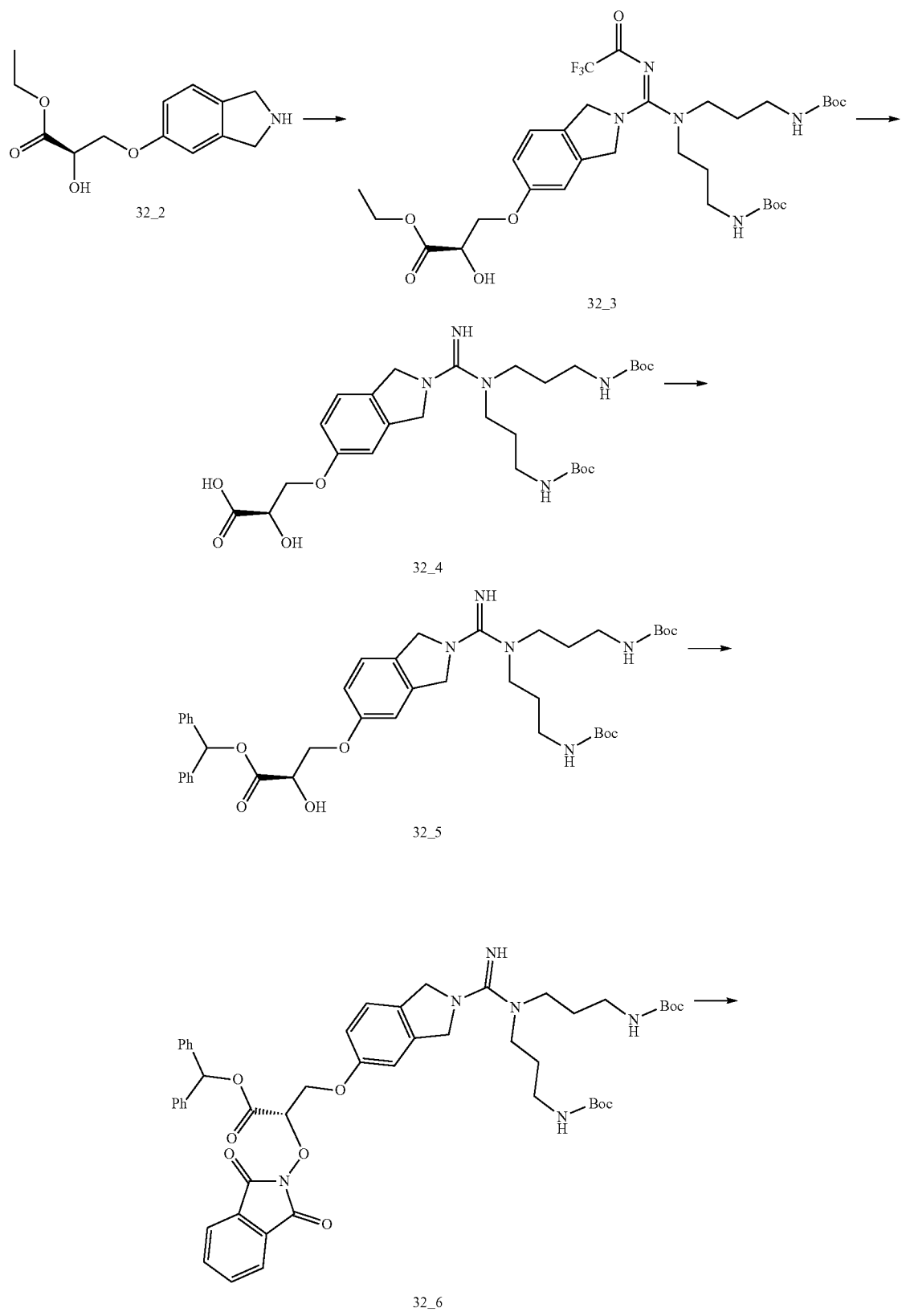

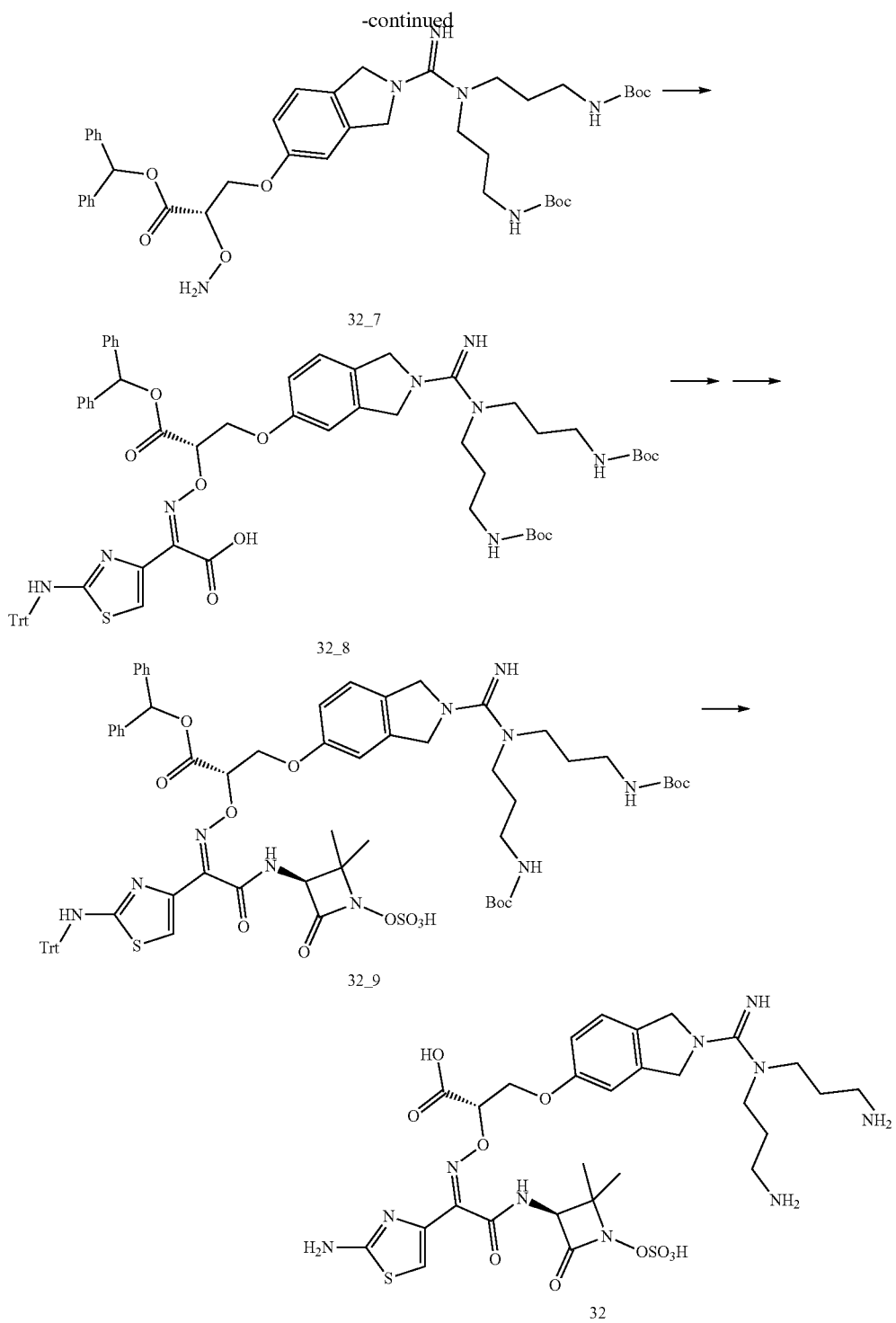

Step 1: Catalyst A8 (673.34 mg, 800.64 μmol, 0.03 eq) was added to a solution of intermediate 13_5 (6.8 g, 26.69 mmol, 1 eq), ethyl oxirane-2-carboxylate (7.75 g, 66.72 mmol, 2.5 eq), 4 Å molecular sieve (8 g) in MTBE (10 mL), and the mixture was purged with nitrogen three times and then stirred at 20° C. for 12 hours. The reaction mixture was diluted with ethyl acetate (30 mL) and filtered; the filtrate was concentrated under reduced pressure and purified by column chromatography (SiO$_2$, petroleum ether/ethyl acetate=6/1 to 3/1 (v/v)) to obtain compound 32_1.

Step 2: TFA (14.88 g, 130.51 mmol, 9.66 mL, 7.53 eq) was added to a solution of compound 32_1 (6.3 g, 17.32 mmol, 1 eq) in DCM (20 mL) at 0° C., and the mixture was stirred at 20° C. for 1 hour and then concentrated under reduced pressure to obtain the trifluoroacetate of compound 32_2.

Step 3: Triethylamine (2.95 g, 29.20 mmol, 4.06 mL, 4 eq) and the trifluoroacetate of compound 32_2 (5.33 g, 14.60 mmol, 2 eq) were added to a solution of intermediate A6 (3.8 g, 7.30 mmol, 1 eq) in DMF (30 mL). The mixture was stirred at 45° C. for 2 hours and then concentrated under reduced pressure to remove DMF. The residue was diluted with water (50 mL) and extracted with ethyl acetate (50 mL). The combined organic layers were washed with saturated aqueous sodium chloride solution (25 mL), dried over anhydrous sodium sulfate, filtered and concentrated under reduced pressure, and the obtained residue was purified by column chromatography (SiO₂, petroleum ether/ethyl acetate=1/1 to 0/1) to obtain compound 32_3.

Step 4: NaOH (378.39 mg, 9.46 mmol, 2.1 eq) was added to a solution of compound 32_3 (3.3 g, 4.50 mmol, 1 eq) in MeOH (20 mL). The mixture was stirred at 20° C. for 17 hours, and the pH of the reaction mixture was adjusted to 3-4 with dilute hydrochloric acid (2 M), and the mixture was concentrated under reduced pressure, and then the residue was diluted with methanol (20 mL), filtered and concentrated under reduced pressure to obtain compound 32_4.

Step 5: Diphenyldiazomethane (1.34 g, 6.90 mmol, 2 eq) was added to a solution of compound 32_4 (2 g, 3.45 mmol, 1 eq) in MeOH (20 mL). The mixture was stirred at 20° C. for 12 hours and concentrated under reduced pressure, and the residue was diluted with water (20 mL) and extracted with DCM (40 mL). The combined organic layers were washed with saturated aqueous sodium chloride solution (10 mL), dried over anhydrous sodium sulfate, then filtered and concentrated under reduced pressure, and the residue was purified by column chromatography (SiO₂, DCM/MeOH=20/1 to 10/1 (v/v)) to obtain compound 32_5.

Step 6: PPh₃ (560.04 mg, 2.14 mmol, 1.5 eq) and DIAD (431.75 mg, 2.14 mmol, 415.15 µL, 1.5 eq) were added to a solution of compound 32_5 (1.2 g, 1.42 mmol, 1 eq) and 2-hydroxyisoindoline-1,3-dione (278.65 mg, 1.71 mmol, 1.2 eq) in THF (12 mL) at 0° C. The mixture was stirred at 20° C. for 1 hour and then concentrated under reduced pressure to remove THF, and the residue was purified by column chromatography (SiO₂, DCM/EtOH=20/1 to 10/1 (v/v)) to obtain compound 32_6.

Step 7: NH₂NH₂H₂O (77.95 mg, 1.32 mmol, 75.68 µL, 85% purity, 1.2 eq) was added to a solution of compound 32_6 (1 g, 1.10 mmol, 1 eq) in EtOH (10 mL). The mixture was stirred at 20° C. for 30 minutes, filtered and concentrated under reduced pressure, and the residue was diluted with water (10 mL) and extracted with DCM (20 mL). The combined organic layers were dried over anhydrous ammonium sulfate, filtered and concentrated under reduced pressure to obtain compound 32_7.

Step 8: Intermediate A2 (416.01 mg, 1.00 mmol, 1 eq) was added to a solution of compound 32_7 (900 mg, 1.00 mmol, 1 eq) in DCM (5 mL) and EtOH (5 mL), and the mixture was stirred at 20° C. for 1 hour under nitrogen atmosphere, then the reaction mixture was concentrated under reduced pressure, and the residue was purified by column chromatography (SiO₂, DCM/MeOH=20/1 to 10/1 (v/v)) to obtain compound 32_8.

Step 9: N,N'-Diisopropylcarbodiimide (41.24 mg, 326.77 µmol, 2 eq) and HOBt (44.15 mg, 326.77 µmol, 2 eq) were added to a solution of compound 32_8 (200 mg, 163.39 µmol, 1 eq) in DMF (2 mL). The mixture was stirred at 20° C. for 1 hour and then intermediate A1 (48.08 mg, 228.74 µmol, 1.4 eq) and NaHCO₃ (54.90 mg, 653.55 µmol, 25.42 µL, 4 eq) were added thereto, and then the reaction mixture was stirred at 20° C. for 11 hours. The reaction mixture was diluted with water (8 mL), and the solid was collected by filtration to obtain compound 32_9.

Step 10: TFA (1.54 g, 13.51 mmol, 1 mL, 82.85 eq) was added to a solution of compound 32_9 (220 mg, 163.01 µmol, 1 eq) in DCM (1 mL) at 0° C. and stirred for 1 hour. The reaction mixture was diluted with petroleum ether/ethyl acetate (10 mL, 4/1) and the solid was collected by filtration and then purified by preparative HPLC (TFA, column: Phenomenex Synergi C18 150×25×10 µm; mobile phase: [water (0.1% TFA)-acetonitrile]; acetonitrile %: 1%-30%, 9 min) to obtain compound 32.

¹H NMR (400 MHz, D₂O) δ=7.23 (d, J=8.4 Hz, 1H), 7.10 (s, 1H), 6.93-6.85 (m, 2H), 5.19 (dd, J=2.0, 5.7 Hz, 1H), 4.87-4.76 (m, 4H), 4.64 (s, 1H), 4.54-4.48 (m, 1H), 4.44-4.37 (m, 1H), 3.43 (br t, J=7.3 Hz, 4H), 3.04-2.91 (m, 4H), 1.98 (quin, J=7.6 Hz, 4H), 1.41 (s, 3H), 0.97 (s, 3H) ppm; LCMS (ESI) m/z: 741.3 (M+1).

Embodiment 2: Compound 41

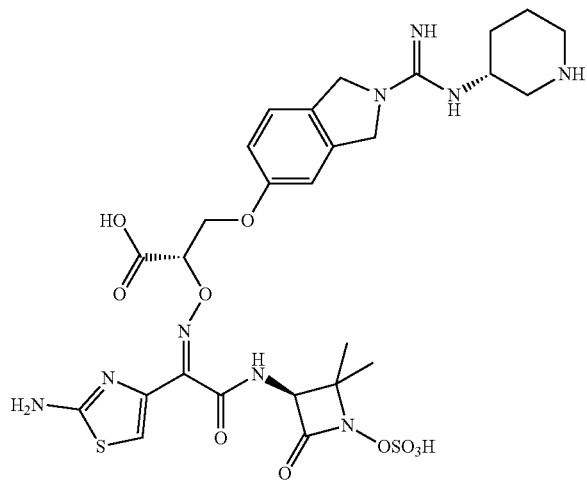

41

-continued
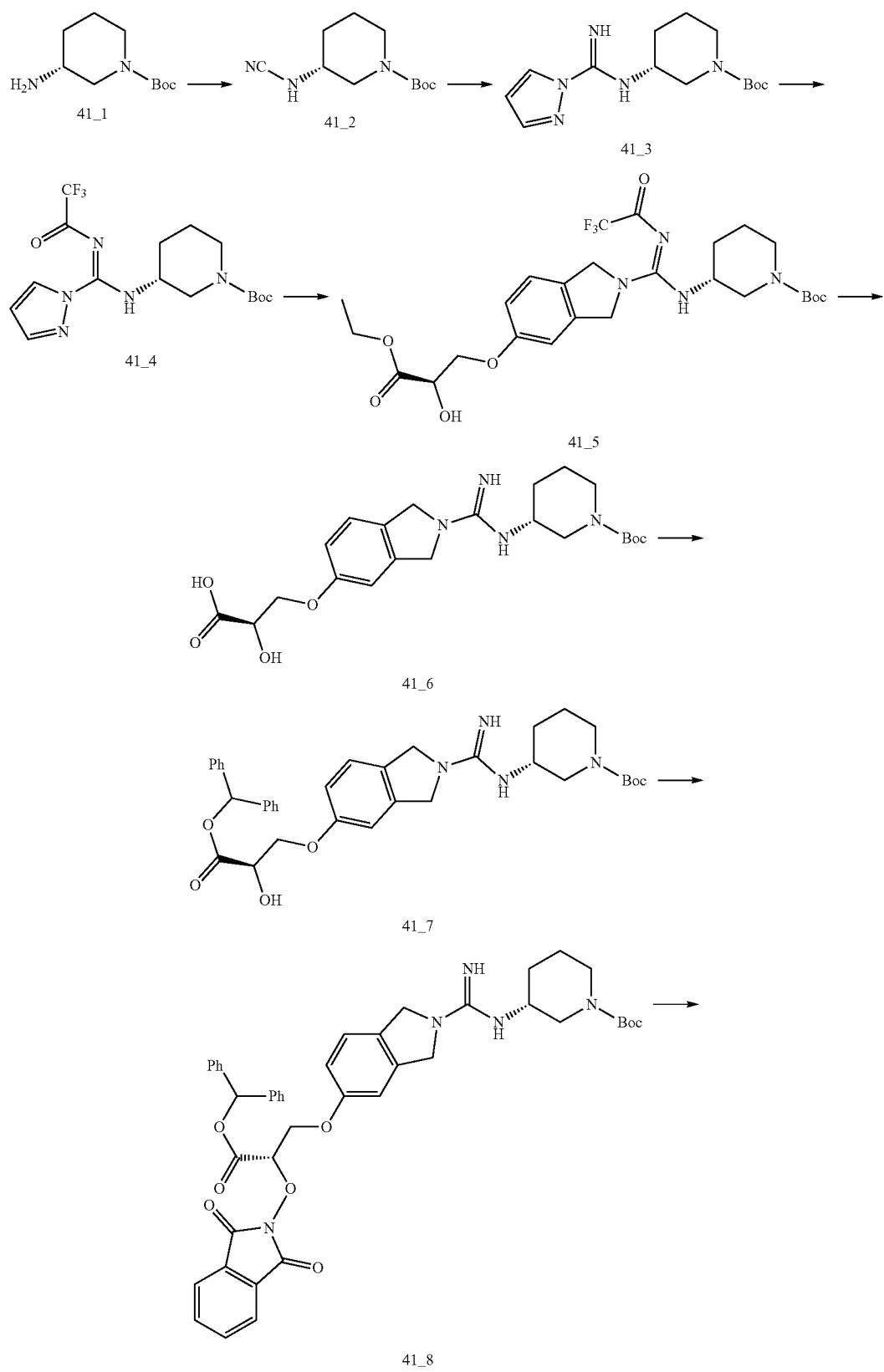

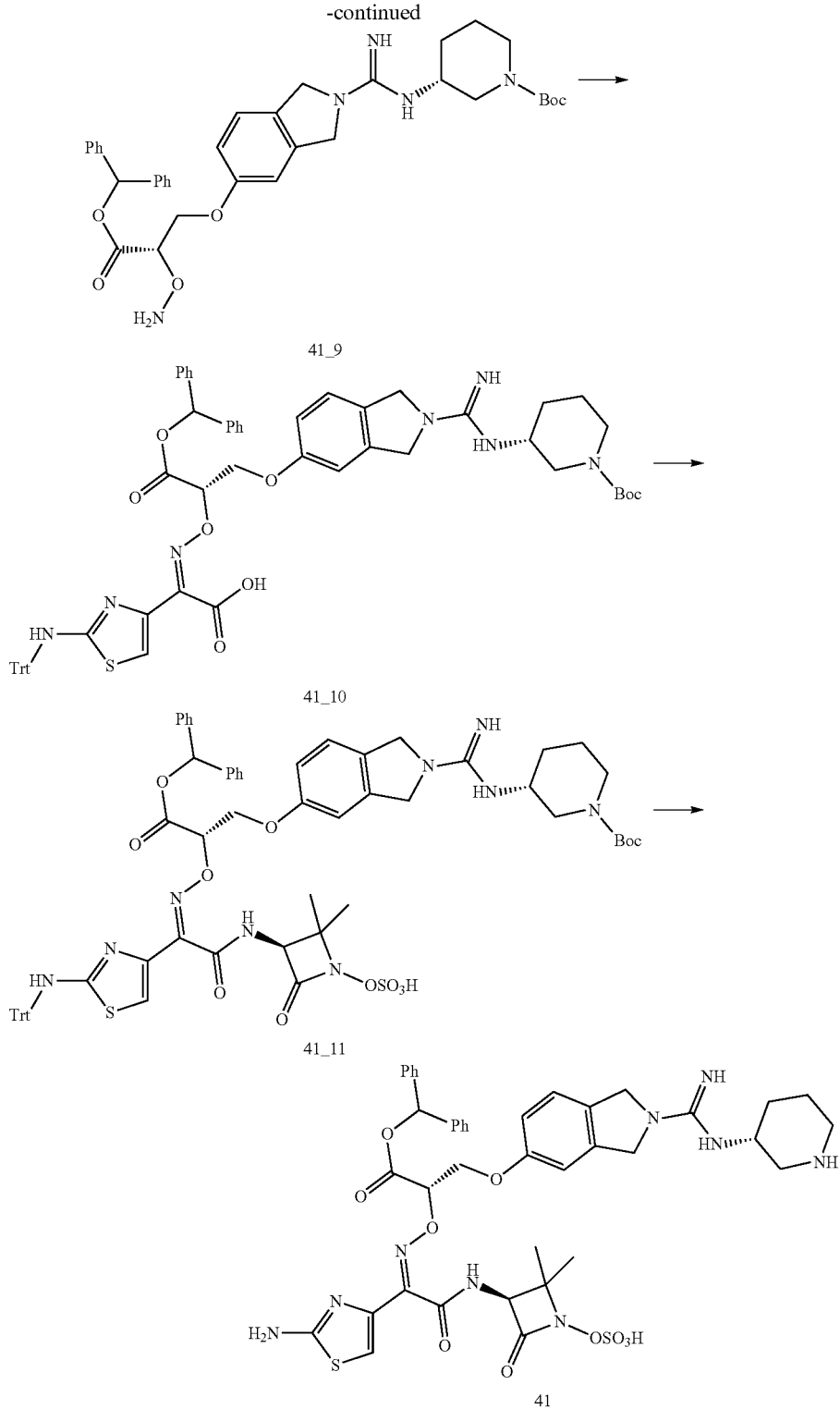

Step 1: Cyanogen bromide (11 g, 103.85 mmol, 7.64 mL, 2.08 eq) and sodium acetate (10.24 g, 124.83 mmol, 2.5 eq) were added to a solution of compound 41_1 (10 g, 49.93 mmol, 1 eq) in methanol (10 mL). The mixture was stirred at 20° C. for 1 hour, poured into water (50 mL) and stirred for 5 minutes, and the aqueous phase was extracted with ethyl acetate (100 mL*3); the combined organic phases were washed with saturated sodium chloride (30 mL), and then dried over anhydrous sodium sulfate, filtered and concentrated under reduced pressure to obtain compound 41-2;

Step 2: Pyrazole hydrochloride (5.61 g, 53.71 mmol, 1.1 eq) was added to a solution of compound 41_2 (11 g, 48.83 mmol, 1 eq) in tetrahydrofuran (80 mL). The mixture was stirred at 70° C. for 12 hours, filtered, and the filtrate was concentrated under reduced pressure to obtain compound 41_3; LCMS (ESI) m/z: 294.0 (M+1);

Step 3: Trifluoroacetic anhydride (7.88 g, 37.50 mmol, 5.22 mL, 1 eq) and triethylamine (7.59 g, 74.99 mmol, 10.44 mL, 2 eq) were added to a solution of compound 41_3 (11 g, 37.50 mmol, 1 eq) in dichloromethane (100 mL). The mixture was stirred at 15° C. for 1 hour and then poured into water (50 mL) and stirred for 5 minutes. The aqueous phase was extracted with dichloromethane (100 mL*2); the combined organic phases were washed with saturated sodium chloride (30 mL), dried over anhydrous sodium sulfate, filtered and concentrated under reduced pressure to obtain compound 41_4;

Step 4: Triethylamine (11.08 g, 109.50 mmol, 15.24 mL, 4 eq) and compound 41_4 (10 g, 25.68 mmol, 0.94 eq) were added to a solution of the trifluoroacetate of compound 32_2 (10 g, 27.37 mmol, 1 eq) in DMF (100 mL). The mixture was stirred at 40° C. for 12 hours and then poured into water (50 mL) and stirred for 5 minutes. The aqueous phase was extracted with ethyl acetate (200 mL*2); the combined organic phases were washed with brine (50 mL), dried over anhydrous sodium sulfate, filtered and concentrated under reduced pressure, and the residue was purified by silica gel chromatography ($SiO_2$, petroleum ether/ethyl acetate=1/0 to 0/1) to obtain compound 41_5.

Step 5: Sodium hydroxide (1.68 g, 41.92 mmol, 4 eq) was added to a solution of compound 41_5 (6 g, 10.48 mmol, 1 eq) in methanol (60 mL). The mixture was stirred at 20° C. for 12 hours and then stirred at 35° C. for another 3 hours, and then the pH of the mixture was adjusted to 4-5 and the mixture was concentrated under reduced pressure to obtain compound 41_6.

Step 6: A solution of diphenyldiazomethane (5.9 g, 30.38 mmol, 2.90 eq) in dichloromethane (60 mL) was added dropwise to a solution of compound 41_6 (4.7 g, 10.48 mmol, 1 eq) in methanol (60 mL). The mixture was stirred at 20° C. for 1 hour and then extracted with dichloromethane (100 mL). The combined organic phases were washed with saturated sodium chloride (100 mL*2), dried over anhydrous sodium sulfate, filtered and concentrated under reduced pressure, and the residue was purified by silica gel chromatography ($SiO_2$, dichloromethane/methanol=1/0 to 10/1) to obtain compound 41_7.

Step 7: 2-Hydroxyisoindoline-1,3-dione (835.91 mg, 5.12 mmol, 1.05 eq), triphenylphosphine (1.92 g, 7.32 mmol, 1.5 eq) and DIAD (1.97 g, 9.76 mmol, 1.90 mL, 2 eq) were added to a solution of compound 41_7 (1.92 g, 7.32 mmol, 1.5 eq) in tetrahydrofuran (30 mL). The mixture was stirred at 20° C. for 12 hours and concentrated under reduced pressure, and the residue was purified by silica gel chromatography ($SiO_2$, dichloromethane/methanol=50/1 to 20/1) to obtain compound 41_8. LCMS (ESI) m/z: 760.6 (M+1).

Step 8: $NH_2NH_2H_2O$ (174.64 mg, 2.97 mmol, 169.55 µL, 85% purity, 1 eq) was added to a solution of compound 41_8 (2.7 g, 2.97 mmol, 1 eq) in ethanol (30 mL). The mixture was stirred at 20° C. for 20 minutes, then filtered and concentrated under reduced pressure to obtain compound 41_9.

Step 9: Intermediate A2 (1.24 g, 3.00 mmol, 0.9 eq) was added to a solution of compound 41_9 (1.24 g, 3.00 mmol, 3.13 mmol, 1 eq) in methanol (27 mL) and dichloromethane (9 mL). The mixture was stirred at 20° C. for 30 minutes and then concentrated under reduced pressure, and the obtained solid was washed with petroleum ether/ethyl acetate (30 mL, v/v=1/1) to obtain compound 41_10. LCMS (ESI) m/z: 1026.4 (M+1);

Step 10: HOBt (682.58 mg, 5.05 mmol, 2 eq) and DIC (637.52 mg, 5.05 mmol, 782.23 µL, 2 eq) were added to a solution of compound 41_10 (3 g, 2.53 mmol, 1 eq) in DMF (30 mL). The mixture was stirred at 20° C. for 1 hour, then intermediate A1 (796.42 mg, 3.79 mmol, 1.5 eq) and sodium bicarbonate (848.77 mg, 10.10 mmol, 392.95 µL, 4 eq) were added thereto, and the mixture was stirred at 20° C. for 12 hours, and then poured into water (30 mL) and stirred for 5 minutes, then filtered and the filter cake was collected to obtain compound 41_11.

Step 11: Trifluoroacetic acid (13.48 g, 118.18 mmol, 8.75 mL, 41.14 eq) was added to a solution of compound 41_11 (3.5 g, 2.87 mmol, 1 eq) in dichloromethane (10 mL). The mixture was stirred at 0° C. for 1 hour and then added to petroleum ether/ethyl acetate (30 mL, v/v=1/3) and stirred for 5 minutes, filtered to obtain a filter cake. The residue was purified by preparative high performance liquid chromatography (column: Kromasil 250*50 mm*10 µm; mobile phase: [water (0.1% trifluoroacetic acid)-acetonitrile]; acetonitrile %: 2% acetonitrile-30% acetonitrile, 25 min, 69% min) to obtain compound 41. $^1H$ NMR (400 MHz, $d_6$-DMSO) δ=7.26 (br d, J=8.8 Hz, 1H), 7.10 (br s, 1H), 6.92 (br s, 2H), 5.21-5.09 (m, 1H), 5.06-4.92 (m, 1H), 4.62-4.60 (m, 2H), 4.57 (br s, 2H), 4.47-4.37 (m, 2H), 3.96-3.81 (m, 1H), 3.54 (br d, J=12.2 Hz, 1H), 3.34 (br d, J=12.8 Hz, 1H), 3.07-2.91 (m, 2H), 2.17 (br s, 1H), 2.03 (br d, J=9.7 Hz, 1H), 1.87-1.64 (m, 2H), 1.42 (s, 3H), 1.00 (br s, 3H) ppm; LCMS (ESI) m/z: 710.4 (M+1).

Embodiment 3: Compound 43

43

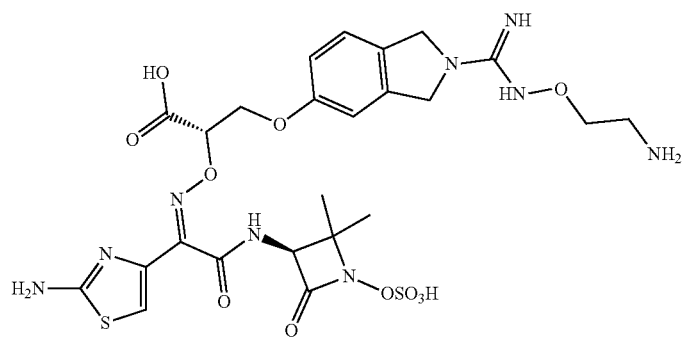

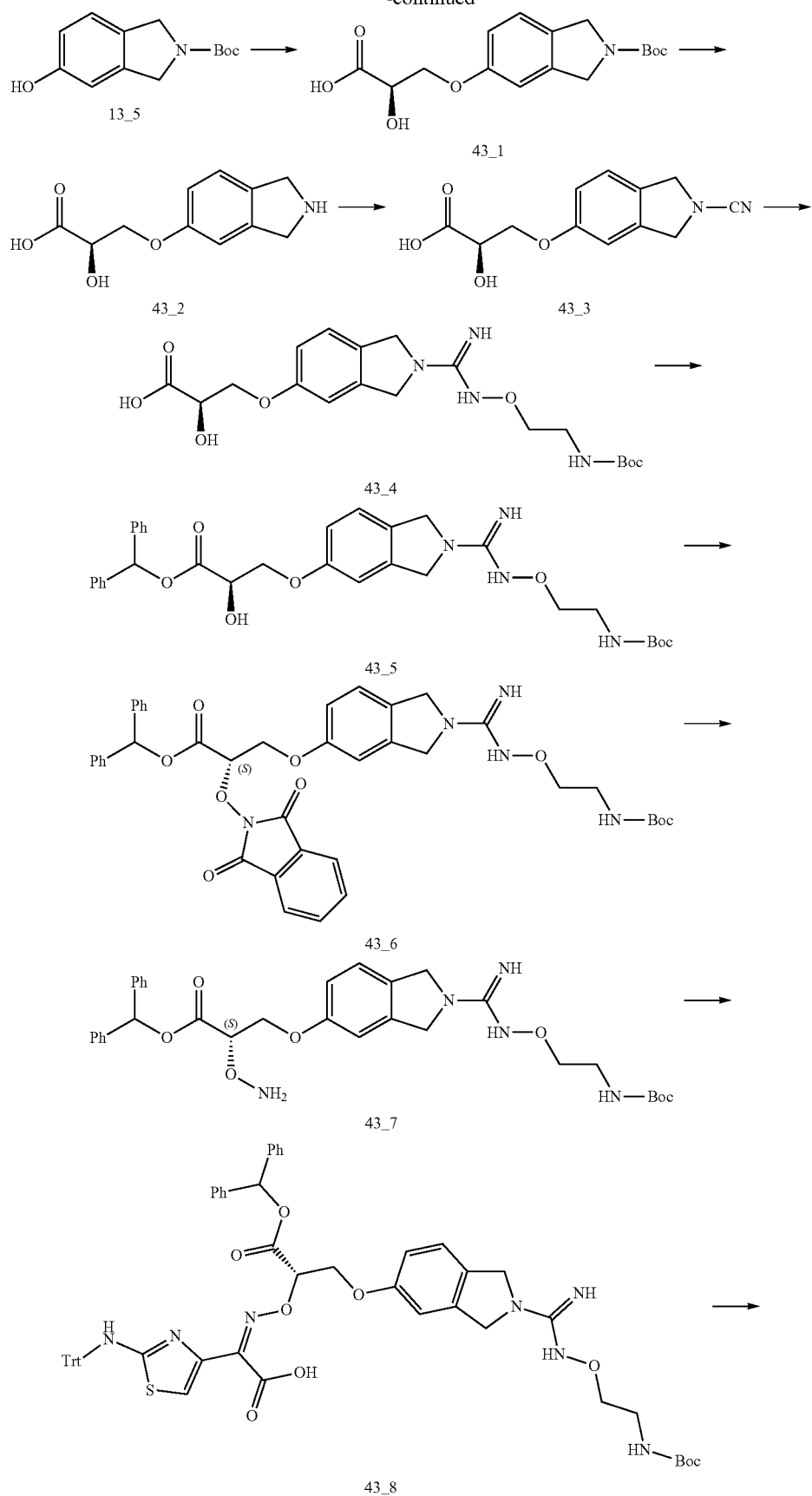

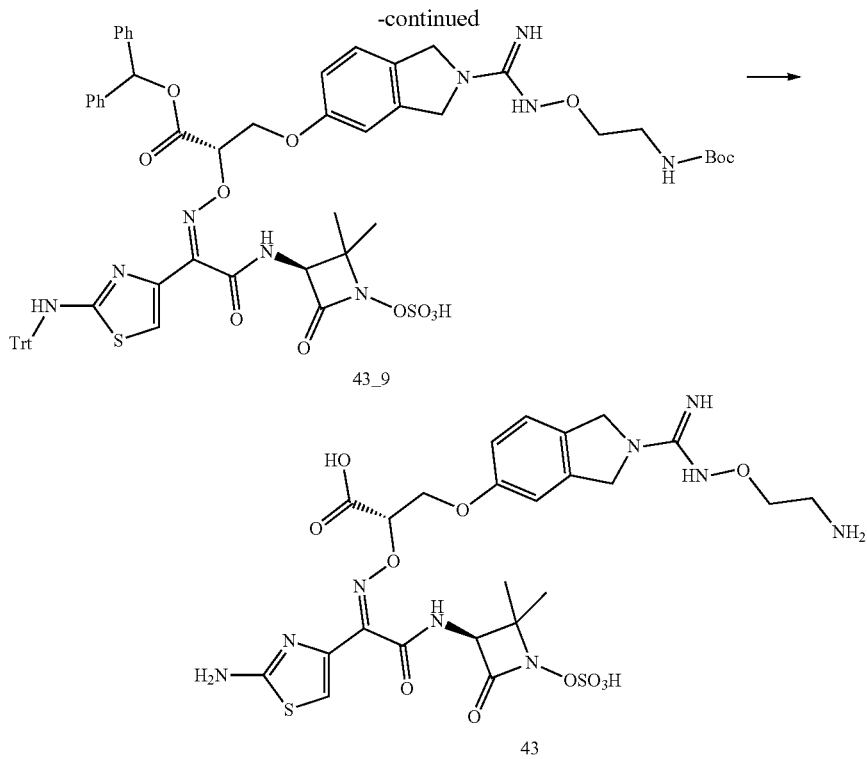

Step 1: NaH (38.22 g, 955.67 mmol, 60% purity, 1.88 eq) was added to a solution of compound 13_5 (130 g, 508.33 mmol, 1 eq) in THF (1200 mL) and DMF (300 mL) at −30 to −10° C., and the mixture was stirred for 15 minutes, then the intermediate A10 (53.80 g, 432.08 mmol, 0.85 eq) was slowly added to the reaction solution in portions; the mixture was heated to 70 to 75° C. and the reaction was conducted for 3 hours, then the reaction mixture was cooled to room temperature, and was diluted with water (1500 mL), then washed with ethyl acetate (500 mL*2), and the combined organic layers were washed with water (500 mL); the combined aqueous layers were acidified to pH=1 with dilute hydrochloric acid (1 M), and then extracted with ethyl acetate (700 mL*3); the combined organic phases were washed with brine (500 mL) and concentrated, then ethyl acetate/petroleum ether (1500 mL, 1/1) was added to the residue and the mixture was stirred until most solids were precipitated, and the solids were collected by filtration to obtain compound 43_1.

Step 2: Trifluoroacetic acid (215.60 g, 1.89 mol, 140 mL, 10.19 eq) was added to a solution of compound 43_1 (60 g, 185.56 mmol, 1 eq) in DCM (420 mL) at 0 to 5° C., after the mixture was stirred for 1.5 hours, the mixture was concentrated under reduced pressure to obtain compound 43_2.

Step 3: Sodium bicarbonate (64.95 g, 773.17 mmol, 5 eq) was added to a solution of compound 43_2 (52.15 g, 154.63 mmol, 1 eq, TFA) in water (500 mL), then cooled to 0 to 5° C.; BrCN (19.65 g, 185.56 mmol, 13.65 mL, 1.2 eq) was added to the mixture in one portion, after the mixture was stirred for 3 hours, DCM (1500 mL) was added thereto, then the mixture was acidified with dilute hydrochloric acid (1 M) to pH=1, and the mostly grey solid precipitated out, and the solid was collected by filtration; the aqueous layer was extracted with ethyl acetate (500 mL*3), and the combined organic layers were dried over anhydrous sodium sulfate, filtered, and the filtrate was concentrated to about 200 mL to precipitate solids; the solids were collected by filtration, and the combined solids were dried to obtain compound 43_3.

Step 4: A10_2 (2.48 g, 14.10 mmol, 1.0 eq) and A10 (3.00 g, 14.10 mmol, 1.0 eq, HCl) were added to a solution of compound 43_3 (3.5 g, 14.10 mmol, 1 eq) in ethanol (35 mL), and the mixture was stirred at 90° C. for 12 hours under nitrogen atmosphere, then filtered and the solid was collected to obtain compound 43_4; LCMS (ESI) m/z: 425.2 (M+1).

Step 5: A solution of diphenyldiazomethane (1.78 g, 9.18 mmol, 4 eq) in dichloromethane (10 mL) was added to a solution of compound 43_4 (1.3 g, 2.30 mmol, 1 eq) in methanol (20 mL). The mixture was stirred at 25° C. for 1 hour and then concentrated under reduced pressure, and the residue was purified by column chromatography (SiO$_2$, DCM/MeOH=30/1 to 10/1) to obtain compound 43_5; LCMS (ESI) m/z: 591.3 (M+1).

Step 6: 2-Hydroxyisoindoline-1,3-dione (272.75 mg, 1.67 mmol, 1.1 eq), triphenylphosphine (438.54 mg, 1.67 mmol, 1.1 eq) and DIAD (307.36 mg, 1.52 mmol, 295.53 μL, 1 eq) were added to a solution of compound 43_5 (900 mg, 1.52 mmol, 1 eq) in THF (10 mL). The reaction was stirred at room temperature (10 to 15° C.) for 12 hours and concentrated under reduced pressure, then the residue was purified by column chromatography (SiO$_2$, DCM/MeOH=50/1 to 10/1) to obtain compound 43_6.

Step 7: NH$_2$NH$_2$·H$_2$O (37.62 mg, 85% purity, 1 eq) was added to a solution of compound 43_6 (470 mg, 638.78 δmol, 1 eq) in ethanol (2 mL) and dichloromethane (2 mL). The reaction mixture was stirred at room temperature (15 to 20° C.) for 1 hour. After the reaction mixture was filtered and the filtrate was concentrated under reduced pressure; the residue was diluted with dichloromethane (5 mL) and washed with brine, dried over anhydrous sodium sulfate, and concentrated under reduced pressure to obtain compound 43_7.

Step 8: Intermediate A2 (266.88 mg, 1 eq) was added to a solution of compound 43_7 (390 mg, 1 eq) in ethanol (3 mL) and dichloromethane (2 mL). The mixture was stirred at room temperature (15 to 20° C.) for 1 hour and concentrated under reduced pressure, then the residue was stirred in petroleum ether/ethyl acetate (10 mL, 4/1) and filtered to obtain compound 43_8.

Step 9: Diisopropylcarbodiimide (138.52 mg, 1.10 mmol, 169.97 μL, 2 eq) and HOBt (148.32 mg, 1.10 mmol, 2 eq) were added to a solution of compound 43_8 (550 mg, 1 eq) in DMF (3 mL), and the mixture was stirred at 20° C. for 1 hour, then intermediate A1 (161.51 mg, 1.4 eq) and NaHCO$_3$ (184.42 mg, 2.20 mmol, 4 eq) were added thereto, and the mixture was stirred at 20° C. for 11 hours then poured into water (20 mL), then the solid collected by filtration was dissolved in dichloromethane (100 mL), dried over anhydrous sodium sulfate, filtered, and concentrated under reduced pressure. The obtained residue was purified by column chromatography (SiO$_2$, DCM/MeOH=30/1 to 20/1) to obtain compound 43_9; LCMS (ESI) m/z: 1194.9 (M+1).

Step 10: Trifluoroacetic acid (924.00 mg, 8.10 mmol, 0.6 mL, 86.58 eq) was added to a solution of compound 43_9 (120 mg, 1 eq) in dichloromethane (0.6 mL) at 0° C., and the mixture was stirred at 0° C. for 1 hour, then diluted with petroleum ether/ethyl acetate (20 mL, 1/4) and stirred for 10 minutes. The solid collected by filtration was purified by preparative high performance liquid chromatography (trifluoroacetic acid column: Phenomenex luna C18 150×25 mm×10 μm; mobile phase: [water (0.1% trifluoroacetic acid)-acetonitrile]; acetonitrile %: 2%-25%, 10 minutes) to obtain compound 43.

$^1$H NMR (400 MHz, d$_6$-DMSO) δ=7.22 (br d, J=9.1 Hz, 1H), 7.04 (s, 1H), 6.92-6.86 (m, 2H), 5.04 (br s, 1H), 4.76 (d, J=3.8 Hz, 3H), 4.59 (s, 2H), 4.46 (br d, J=10.9 Hz, 1H), 4.40-4.32 (m, 1H), 4.21-4.14 (m, 2H), 3.32 (t, J=4.6 Hz, 2H), 1.38 (s, 3H), 0.94 (s, 3H); LCMS (ESI) m/z: 686.5 (M+1).

Embodiment 4: Compound 44

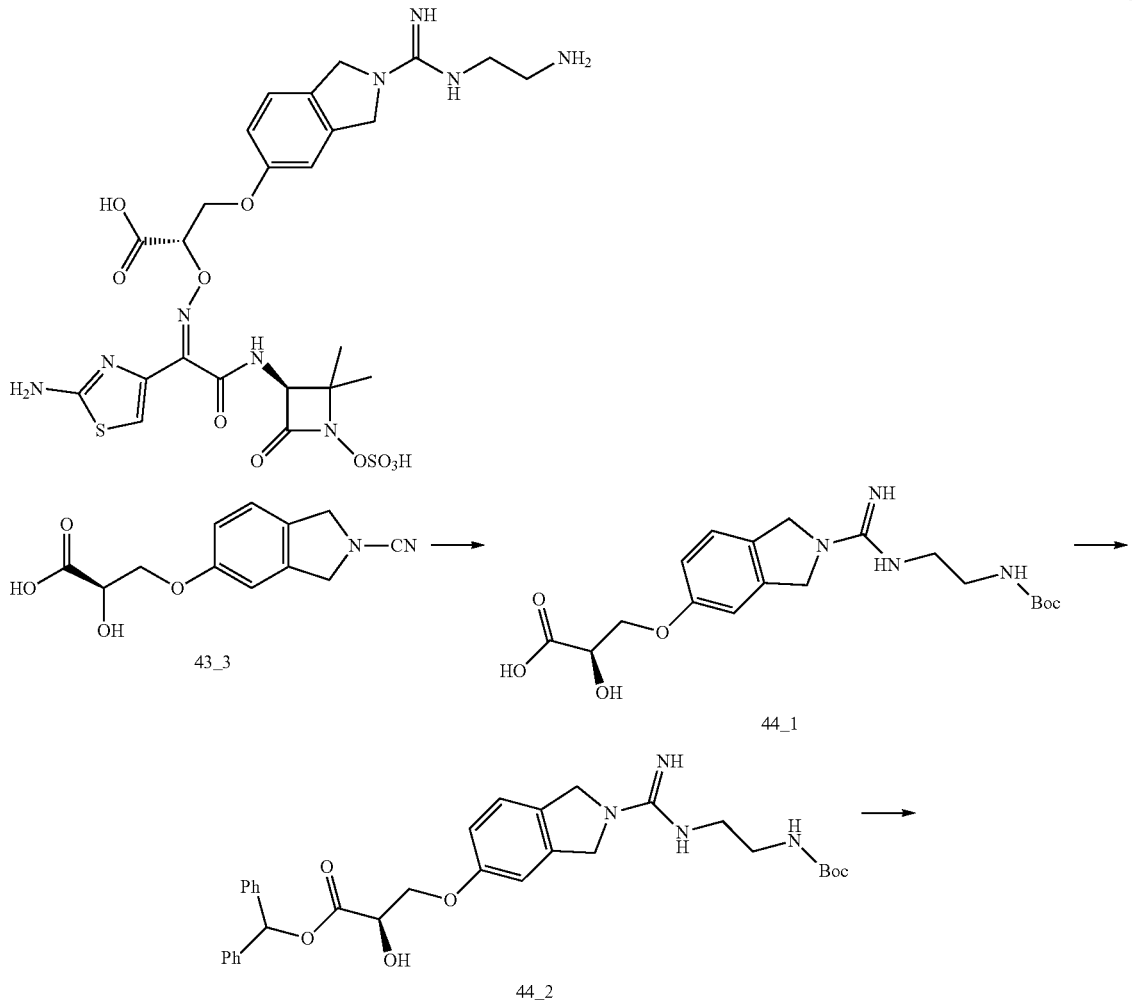

-continued
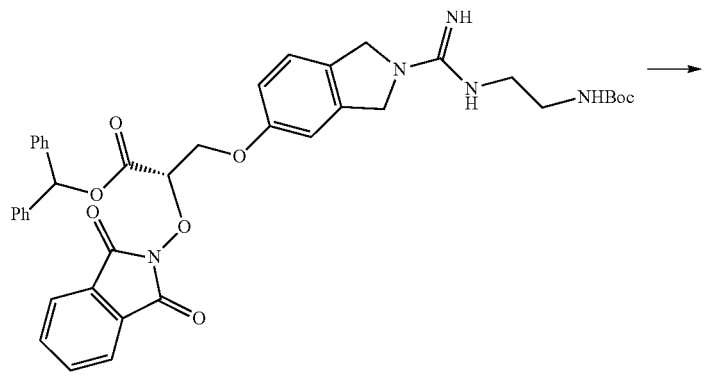
44_3
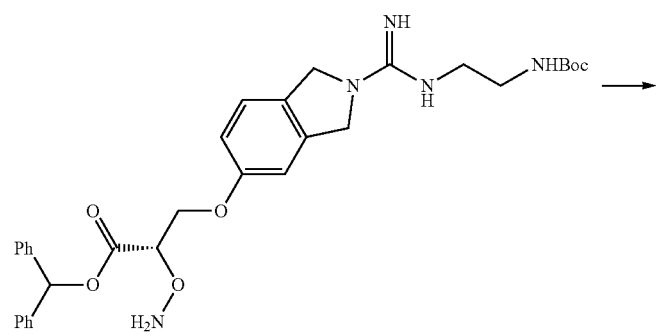
44_4
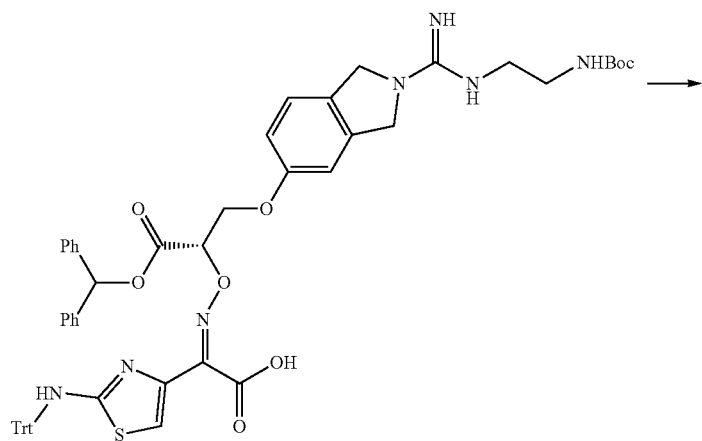
44_5

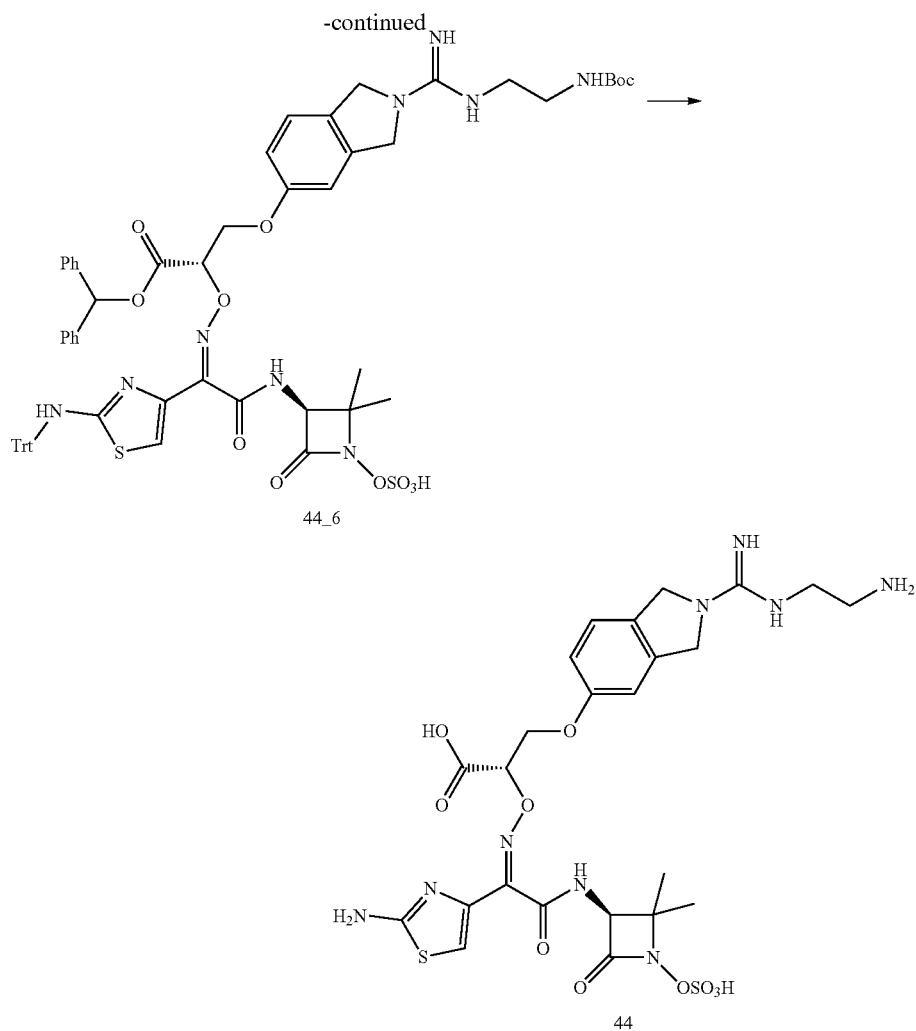

Step 1: N-tert-Butyl (2-aminoethyl)carbamate (2.38 g, 12.09 mmol, 2.33 mL, 1 eq, HCl) and tert-butyl N-(2-aminoethyl)carbamate (1.94 g, 12.09 mmol, 1.90 mL, 1 eq) were added to a solution of compound 43_3 (3 g, 12.09 mmol, 1 eq) in ethanol (30 mL). The mixture was stirred at 90° C. for 12 hours and then ethyl acetate (30 mL) was added thereto. After the mixture was stirred for 5 minutes, the solid was collected by filtration to obtain compound 44_1; LCMS (ESI) m/z: 409.1 (M+1).

Step 2: Dilute hydrochloric acid (8.00 mL, 0.5 M) and diphenyldiazomethane (3.04 g, 15.67 mmol, 2 eq) were added dropwise to a solution of compound 44_1 (4 g, 7.83 mmol, 1 eq) in methanol (40 mL). After the mixture was stirred at 25° C. for 30 minutes, the aqueous phase was extracted with dichloromethane (50 mL*2). The combined organic phases were washed with saturated sodium chloride (30 mL), dried over anhydrous sodium sulfate, filtered and concentrated under reduced pressure. The residue was purified by column chromatography (SiO₂, DCM/MeOH=50/1 to 10/1) to obtain the compound 44_2; LCMS (ESI) m/z: 575.3 (M+1).

Step 3: 2-Hydroxyisoindoline-1,3-dione (1.11 g, 6.79 mmol, 1.1 eq), triphenylphosphine (2.43 g, 9.26 mmol, 1.5 eq) and DIAD (2.50 g, 12.35 mmol, 2.40 mL, 2 eq) were added to a solution of compound 44_2 (3.7 g, 6.17 mmol, 1 eq) in THF (40 mL). The mixture was stirred at 25° C. for 1 hour and then concentrated under reduced pressure. The residue was purified by silica gel chromatography (SiO₂, DCM/MeOH=50/1 to 10/1) to obtain compound 44_3.

Step 4: NH₂NH₂·H₂O (312.26 mg, 6.11 mmol, 303.17 mg, 98% purity, 1 eq) was added to a solution of compound 44_3 (4.4 g, 6.11 mmol, 1 eq) in ethanol (45 mL). The mixture was stirred at 25° C. for 30 minutes, filtered, and the filtrate was concentrated under reduced pressure to obtain compound 44_4.

Step 5: Intermediate A2 (2.02 g, 4.88 mmol, 0.8 eq) was added to a solution of compound 44_4 (3.6 g, 6.11 mmol, 1 eq) in methanol (24 mL) and dichloromethane (8 mL). The mixture was stirred at 25° C. for 30 minutes and concentrated under reduced pressure. The residue was washed with petroleum ether/ethyl acetate (30 mL, 1/1), and the solid was collected by filtration to obtain compound 44_5.

Step 6: DIC (639.86 mg, 5.07 mmol, 785.11 μL, 2 eq) and HOBt (685.11 mg, 5.07 mmol, 2 eq) were added to a solution of compound 44_5 (2.5 g, 2.54 mmol, 1 eq) in DMF (25 mL). The mixture was stirred at 25° C. for 1 hour and then sodium bicarbonate (851.87 mg, 10.14 mmol, 4 eq) and intermediate A1 (639.49 mg, 3.04 mmol, 1.2 eq) were added. The mixture was stirred at 25° C. for another 11 hours, poured into water (50 mL), stirred for 5 minutes, and the solid was collected by filtration to obtain compound 44_6.

Step 7: Trifluoroacetic acid (30.80 g, 270.12 mmol, 20.00 mL, 109.76 eq) was added to a solution of compound 44_6 (2.9 g, 2.46 mmol, 1 eq) in dichloromethane (10 mL) at −40° C. in portions, and the mixture was stirred at 0° C. for 1 hour, then poured into petroleum ether/ethyl acetate (30 mL, v/v=1/2) and stirred for 5 minutes, and filtered. The filter cake was collected and purified by preparative high performance liquid chromatography (column: Phenomenex Luna C18 250×50 mm×10 μm; mobile phase: [water (0.1% trifluoroacetic acid)-acetonitrile]; acetonitrile %: 1%-25%, 10 minutes) to obtain compound 44.

$^1$H NMR (400 MHz, d$_6$-DMSO) δ=7.26 (br d, J=8.4 Hz, 1H), 7.13-7.02 (m, 1H), 6.92 (s, 2H), 5.10 (br s, 1H), 4.94 (br s, 2H), 4.62 (br s, 2H), 4.54-4.46 (m, 2H), 4.39 (br s, 1H), 3.62 (br t, J=5.9 Hz, 2H), 3.24 (br t, J=5.7 Hz, 2H), 1.42 (s, 3H), 0.98 (s, 3H); LCMS (ESI) m/z: 670.2 (M+1).

Embodiment 5: Compound 45

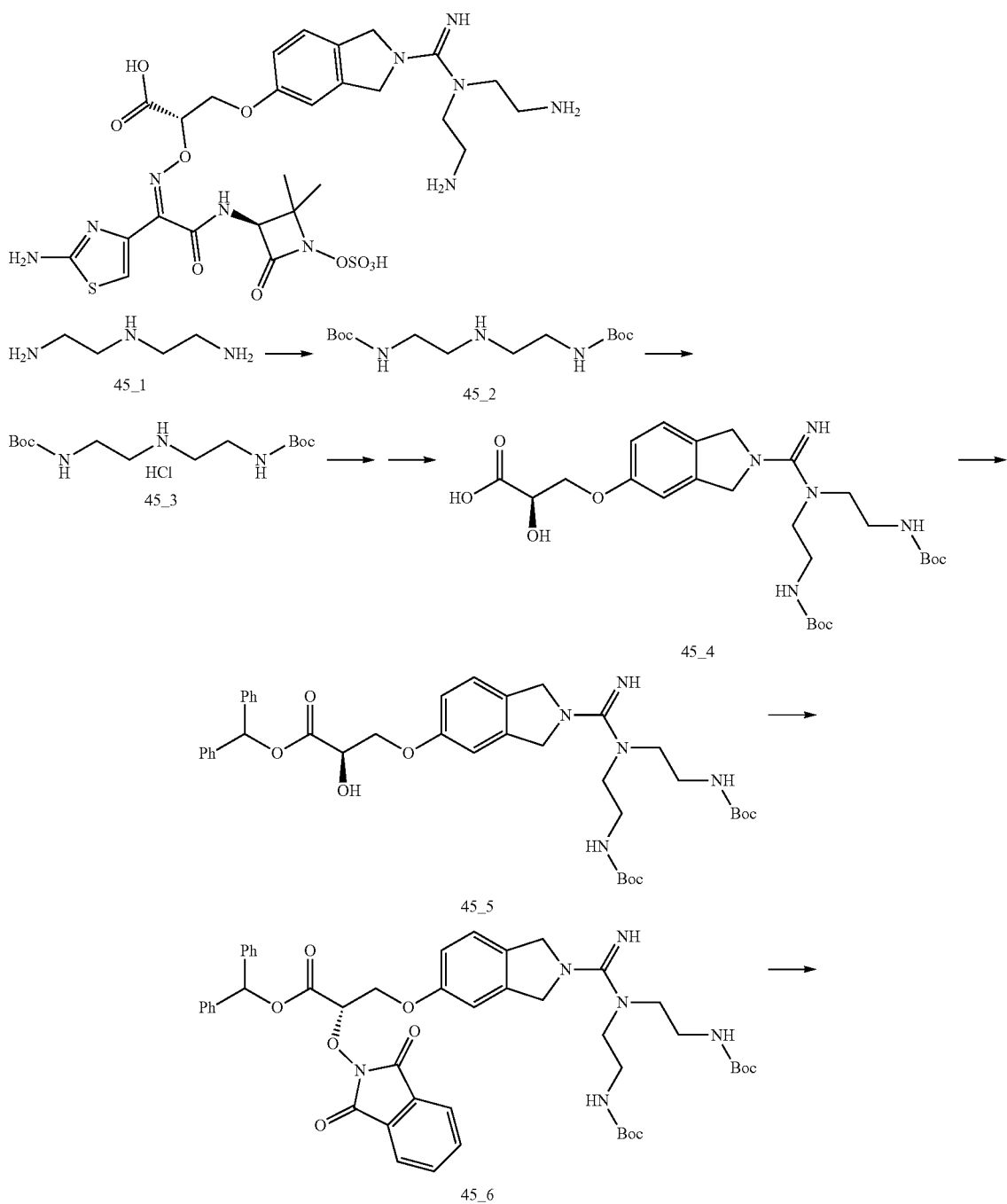

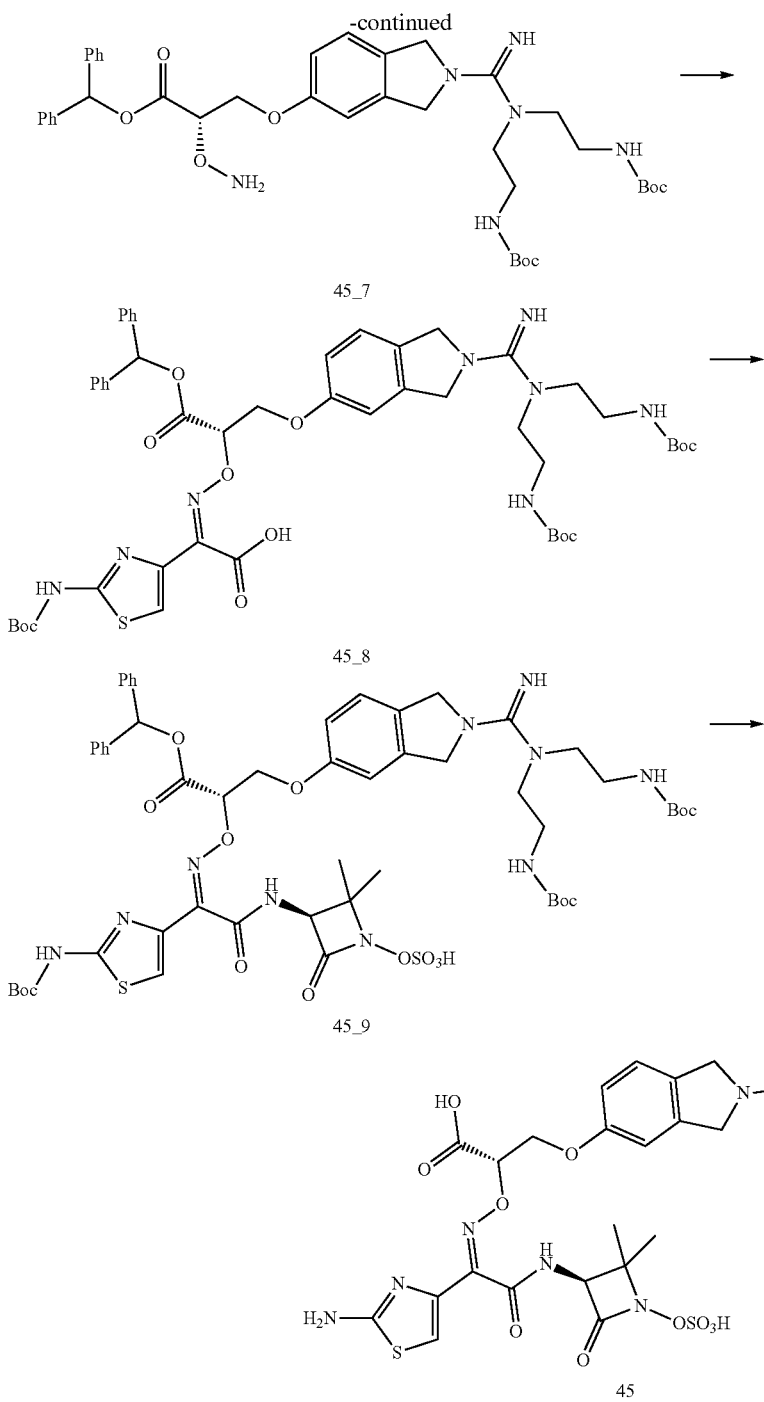

Step 1: tert-Butyl imidazole-1-carboxylate (78.26 g, 465.27 mmol, 2 eq) was added to a solution of compound 45_1 (24 g, 232.63 mmol, 25.13 mL, 1 eq) in THF (250 mL). The mixture was stirred at 60° C. for 12 hours and concentrated under reduced pressure, and the residue was diluted with water (50 mL) and extracted with ethyl acetate (100 mL). The organic layer was washed with saturated sodium chloride (150 mL*2), dried over anhydrous sodium sulfate, filtered and concentrated under reduced pressure, and the residue was sitrred and washed with petroleum ether/methyl tert-butyl ether (200 mL, 1/1), and the solid was collected by filtration to obtain compound 45_2; $^1$H NMR (400 MHz, CDCl$_3$) δ=4.97 (br s, 1H), 3.22 (q, J=5.7 Hz, 2H), 2.74 (t, J=5.8 Hz, 2H), 1.46 (s, 9H).

Step 2: A solution of HCl/EtOAc (8.24 mL, 4 M, 1 eq) was slowly added dropwise to a solution of compound 45_2 (10 g, 32.96 mmol, 1 eq) in ethyl acetate (100 mL) at 0° C. The mixture was stirred at 0° C. for 10 minutes, filtered, and the solid was collected to obtain compound 45_3.

Step 3: Compound 45_2 (3.88 g, 12.79 mmol, 1 eq) and compound 45_3 (4.35 g, 12.79 mmol, 1 eq) were added to a solution of compound 43_3 (3.2 g, 12.79 mmol, 1 eq) in tert-butanol (40 mL), then the mixture was stirred at 100° C.

for 12 hours under nitrogen atmosphere. The crude product obtained by concentration under reduced pressure was diluted with water (50 mL) and the pH was adjusted to 9-10 with dilute lithium hydroxide (1 M), and the mixture was washed with ethyl acetate (50 mL*2); the aqueous layer was cooled to 0° C., and the pH was adjusted to 3-4 with dilute hydrochloric acid (0.5 M), and the aqueous layer was lyophilized to obtain compound 45_4. LCMS (ESI) m/z: 552.4 (M+1).

Step 4: A solution of diphenyldiazomethane (4.58 g, 23.57 mmol, 2 eq) in dichloromethane (50 mL) was added to a solution of compound 45_4 (6.5 g, 11.78 mmol, 1 eq) in methanol (70 mL). The mixture was stirred at 25° C. for 1 hour and concentrated under reduced pressure, and the residue was diluted with water (50 mL), extracted with dichloromethane (100 mL), and the combined organic layers were dried over anhydrous sodium sulfate, filtered and concentrated under reduced pressure, then the obtained residue was purified by column chromatography (SiO$_2$, DCM/MeOH=20/1 to 10/1) to obtain compound 45_5. LCMS (ESI) m/z: 718.4 (M+1).

Step 5: 2-Hydroxyisoindoline-1,3-dione (312.38 mg, 1.91 mmol, 2 eq), triphenylphosphine (502.26 mg, 1.91 mmol, 2 eq) and DIAD (387.21 mg, 1.91 mmol, 2 eq) were added to a solution of compound 45_5 (1.3 g, 957.46 μmol, 1 eq) in THF (15 mL). The mixture was stirred at 20° C. for 0.5 hours and concentrated under reduced pressure, and the obtained residue was purified by column chromatography (SiO$_2$, DCM/MeOH=20/1 to 10/1) to obtain compound 45_6. LCMS (ESI) m/z: 863.5 (M+1).

Step 6: NH$_2$NH$_2$·H$_2$O (64.87 mg, 1.30 mmol, 1.2 eq) was added to a solution of compound 45_6 (1.2 g, 1.08 mmol, 1 eq) in ethanol (15 mL). The mixture was stirred at 20° C. for 1 hour and then filtered and concentrated under reduced pressure, and the obtained residue was dissolved in dichloromethane (20 mL), dried over anhydrous sodium sulfate, filtered and concentrated under reduced pressure to obtain compound 45_7. LCMS (ESI) m/z: 733.4 (M+1).

Step 7: Intermediate A2 (357.95 mg, 1 eq) was added to a solution of compound 45_7 (850 mg, 1 eq) in ethanol (8 mL) and dichloromethane (8 mL), and the mixture was stirred at 20° C. for 1 hour and concentrated under reduced pressure under nitrogen atmosphere, and the obtained residue was purified by column chromatography (SiO$_2$, DCM/MeOH=20/1 to 10/1) to obtain compound 45_8. LCMS (ESI) m/z: 1129.6 (M+1).

Step 7: HOBt (186.65 mg, 1.38 mmol, 2 eq) and DIC (174.33 mg, 1.38 mmol, 2 eq) were added to a solution of compound 45_8 (780 mg, 1 eq) in DMF (5 mL), and the mixture was stirred at room temperature for 1 hour and then intermediate A2 (217.78 mg, 1.04 mmol, 1.5 eq) and sodium bicarbonate (232.09 mg, 2.76 mmol, 4 eq) were added thereto. The mixture was stirred at 20° C. for 11 hours, poured into water (50 mL), stirred for 10 minutes, and filtered. The obtained solid was dissolved in dichloromethane (20 mL), dried over anhydrous sodium sulfate, filtered and concentrated under reduced pressure to obtain compound 45_9. LCMS (ESI) m/z: 1322.3 (M+1).

Step 8: Trifluoroacetic acid (4.62 g, 40.52 mmol, 3 mL, 58.84 eq) was added to a solution of compound 45_9 (910 mg, 1 eq) in dichloromethane (6 mL) at 0° C. The mixture was stirred at 0° C. for 1 hour and diluted with petroleum ether/ethyl acetate (60 mL, 1/4), then the solid was collected by filtration and purified by preparative high performance liquid chromatography (trifluoroacetic acid, column: Phenomenex luna C18 250*50 mm*10 microns; mobile phase: [water (0.1% trifluoroacetic acid)-acetonitrile]; acetonitrile %: 1%-30%, 10 minutes) to obtain compound 45.

$^1$H NMR (400 MHz, DEUTERIUM OXIDE) δ=7.25 (br d, J=8.1 Hz, 1H), 7.09 (s, 1H), 6.96-6.88 (m, 2H), 5.13 (br s, 1H), 4.94-4.82 (m, 4H), 4.64 (s, 1H), 4.51 (br d, J=10.8 Hz, 1H), 4.42-4.34 (m, 1H), 3.70 (br t, J=6.8 Hz, 4H), 3.28 (br t, J=6.8 Hz, 4H), 1.42 (s, 3H), 0.97 (s, 3H); LCMS (ESI) m/z: 713.3 (M+1).

Embodiment 6: Compound 46

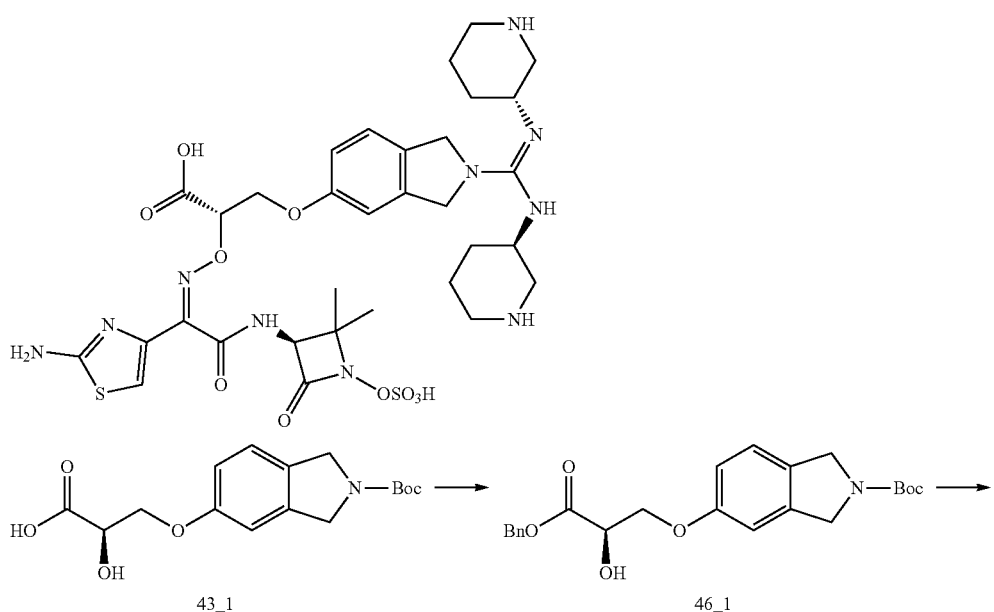

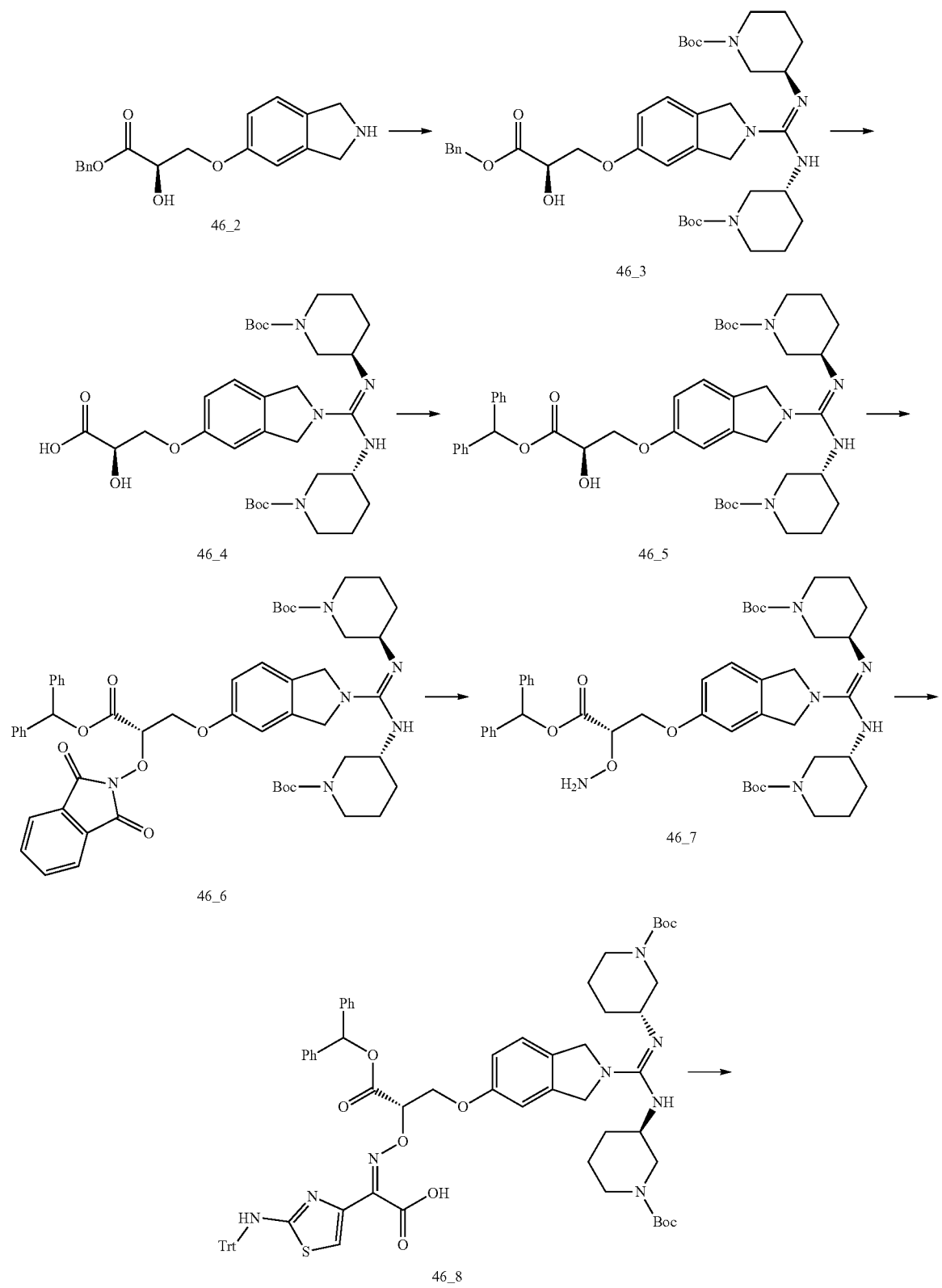

-continued

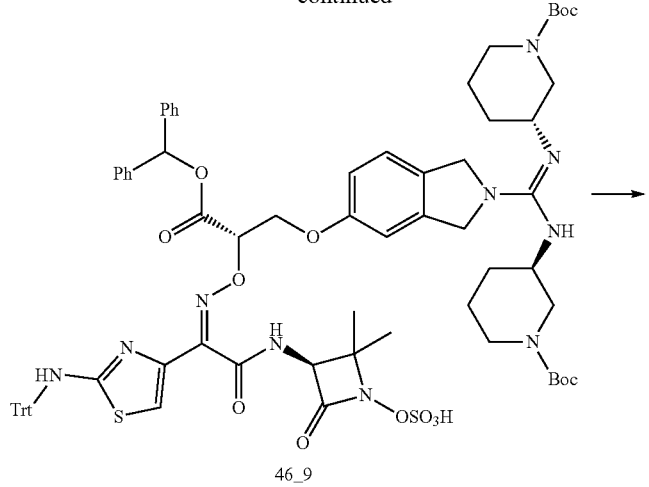

46_9

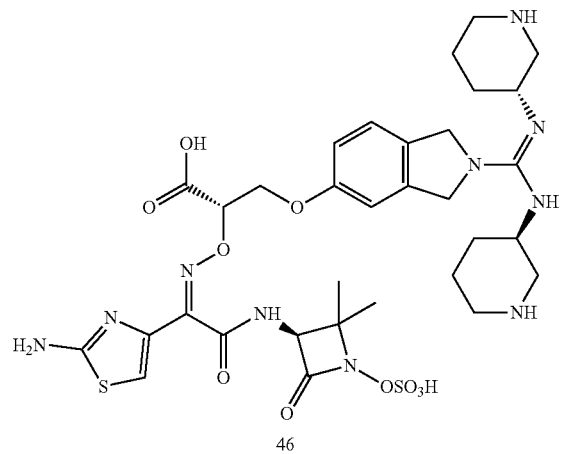

46

Step 1: BnBr (11.64 g, 68.04 mmol, 8.08 mL, 1.1 eq) and potassium carbonate (17.10 g, 123.71 mmol, 2 eq) were added to a solution of compound 43_1 (20 g, 61.85 mmol, 1 eq) in DMF (200 mL). The reaction was stirred at room temperature (20 to 25° C.) for 12 hours and then poured into water (200 mL), and the mixture was extracted with methyl tert-butyl ether (100 mL*3), and the combined organic phases were washed with water (100 mL*2) and saturated sodium chloride (100 mL), dried over anhydrous sodium sulfate, and concentrated under reduced pressure to obtain compound 46_1.

Step 2: Trifluoroacetic acid (20 mL) was added dropwise to a solution of compound 46_1 (10 g, 24.19 mmol, 1 eq) in dichloromethane (50 mL) at 0° C. The reaction mixture was stirred at room temperature (15 to 20° C.) for 1 hour and then concentrated under reduced pressure to obtain compound 46_2.

Step 3: Diisopropylamine (6.64 g, 51.40 mmol, 8.95 mL, 1.5 eq) and intermediate A11 (14.65 g, 34.27 mmol, 1 eq, trifluoroacetate) were added to a solution of compound 46_2 (14 g, 34.27 mmol, 1 eq) in dioxane (140 mL). The mixture was stirred at 60° C. for 1 hour and then concentrated under reduced pressure, and the residue was purified by column chromatography (SiO$_2$, petroleum ether/ethyl acetate=1/0 to 8/1) to obtain compound 46_3; LCMS (ESI) m/z: 722.3 (M+1).

Step 4: Sodium hydroxide (753.59 mg, 18.84 mmol, 2 eq) was added to a solution of compound 46_3 (6.8 g, 9.42 mmol, 1 eq) in MeOH (50 mL). The reaction mixture was stirred at room temperature (10 to 15° C.) for 1 hour and the pH was then adjusted to 3 to 4 with dilute hydrochloric acid (1 M) to obtain a solution of compound 46_4 in methanol; LCMS (ESI) m/z: 633.1 (M+1).

Step 5: A solution of diphenyldiazomethane (8 g, 12.66 mmol, 1 eq) in dichloromethane (50 mL) was added dropwise to a solution of the above compound 46_4 (4.92 g, 25.32 mmol, 2 eq) in methanol. The mixture was stirred and reacted at room temperature (10 to 20° C.) for 1 hour and then concentrated under reduced pressure, then the residue was diluted with dichloromethane (50 mL), and the organic phase was washed with water (30 mL), saturated aqueous sodium chloride solution, and dried over anhydrous sodium sulfate, filtered and concentrated under reduced pressure, and the residue was purified by column chromatography (SiO$_2$, DCM/MeOH=100/1 to 10/1) to obtain compound 46_5; LCMS (ESI) m/z: 798.5 (M+1).

Step 6: Triphenylphosphine (2.96 g, 11.28 mmol, 1.5 eq) and DIAD (2.28 g, 11.28 mmol, 2.19 mL, 1.5 eq) were added to a solution of compound 46_5 (6 g, 7.52 mmol, 1 eq) and 2-hydroxyisoindole-1,3-dione (1.47 g, 9.02 mmol, 1.2 eq) in THF (60 mL). The reaction mixture was stirred at room temperature (10 to 15° C.) for 1 hour and then concentrated under reduced pressure, and the residue was purified by column chromatography (SiO$_2$, DCM/MeOH=50/1 to 10/1) to obtain compound 46_6; LCMS (ESI) m/z: 944.3 (M+1).

Step 7: NH$_2$NH$_2$·H$_2$O (291.95 mg, 5.83 mmol, 1.1 eq) was added to a solution of compound 46_6 (5.00 g, 5.30 mmol, 1 eq) in ethanol (50 mL). The mixture was stirred at 20° C. for 1 hour and concentrated under reduced pressure, and the residue was dissolved in dichloromethane (70 mL), then washed with water (20 mL*2), dried over anhydrous sodium sulfate, filtered, and concentrated under reduced pressure to obtain compound 46_7; LCMS (ESI) m/z: 813.4 (M+1).

Step 8: Intermediate A2 (4.7 g, 5.78 mmol, 1 eq) was added to a solution of compound 46_7 (1.92 g, 4.62 mmol, 0.8 eq) in EtOH (20 mL) and DCM (20 mL). The mixture was stirred at 20° C. for 1 hour and then concentrated under reduced pressure to obtain compound 46_8; LCMS (ESI) m/z: 967.4 (M−243+1).

Step 9: HOBt (167.58 mg, 1.24 mmol, 1.5 eq) and DIC (156.52 mg, 1.24 mmol, 1.5 eq) were added to a solution of compound 46_8 (1 g, 1 eq) in DMF (10 mL). The mixture was stirred at this temperature for 1 hour and then (225.95 mg, 1.07 mmol, 1.3 eq) and sodium bicarbonate (277.83 mg, 3.31 mmol, 128.63 μL, 4 eq) were added thereto. The obtained mixture was stirred at 25° C. for 11 hours, diluted with water (80 mL), filtered and the filter cake was dried under reduced pressure to obtain compound 46_9.

Step 10: Trifluoroacetic acid (6.16 g, 54.02 mmol, 4 mL, 63.10 eq) was added to a solution of compound 46_9 (1.2 g, 856.14 μmol, 1 eq) in DCM (6 mL). The mixture was stirred at 20° C. for 1 hour and then concentrated under reduced pressure, and the residue was purified by preparative high performance liquid chromatography (column: Luna C18 150×25 mm×5 μm; mobile phase: [water (0.075% trifluoroacetic acid)-acetonitrile]; acetonitrile %: 1%-30%, 9 minutes) to obtain compound 46; LCMS (ESI) m/z: 793.2 (M+1); $^1$H NMR (400 MHz, d$_6$-DMSO+D$_2$O) δ=7.30 (d, J=8.4 Hz, 1H), 7.00-6.90 (m, 2H), 6.81 (s, 1H), 4.99-4.70 (m, 5H), 4.57-4.50 (m, 1H), 4.33 (br s, 2H), 3.60 (br s, 2H), 3.29 (br d, J=12.1 Hz, 2H), 2.90-2.65 (m, 5H), 2.33 (br s, 2H), 2.17 (br s, 2H), 1.92 (br s, 2H), 1.67 (br d, J=8.1 Hz, 4H), 1.37 (s, 3H), 1.02 (s, 3H).

Experimental Embodiment 1: Experiment of Compounds on Mice Pulmonary Infection with *Pseudomonas aeruginosa*

1. Experimental Strains
*Pseudomonas aeruginosa* PA14.
2. Drugs to be Tested
(1) Compounds to be Tested: compound 41, compound 44, compound 46

(2) Reference Compounds: AIC499 (I-g, WO2013110643A1), aztreonam (product of Dalian Meilun Biotechnology Co., Ltd.).

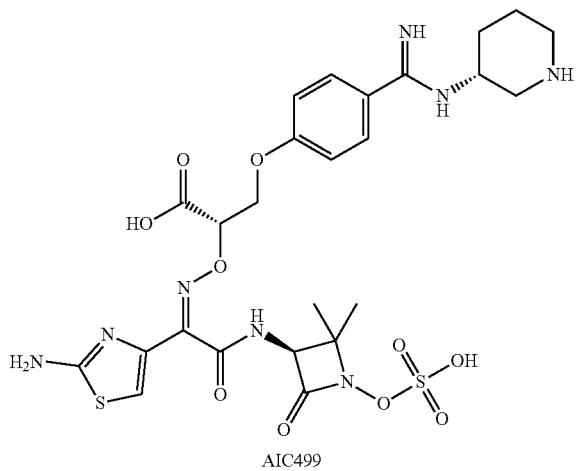 [SMILES: CC1(C)[C@H](NC(=O)/C(=N\O[C@@H](COc2ccc(C(=N)N[C@@H]3CCCNC3)cc2)C(=O)O)c2csc(N)n2)C(=O)N1OS(=O)(=O)O]

AIC499

3. Culture Medium
Mueller-Hinton agar (MHA) and TSA culture medium were purchased from BD Company.

4. Experimental Animals
CD-1 (ICR) mice were provided by Beijing Vital River Laboratory Animal Technology Co., Ltd., weighing 23-27 g, 7 weeks old, female, with a total of 64 mice.

3. Experimental Method
(1) Intraperitoneal Injection of Cyclophosphamide to Form Immunosuppressive Mice 60 mice were intraperitoneally injected with cyclophosphamide 150 mg/kg on the 1st day and the 4th day to form immunosuppressive mice.

(2) Experimental Grouping
There were 8 groups in this experiment, which were compound 41 high and low dose groups, compound 44 high and low dose groups, compound 46 high and low dose groups, reference compound group, aztreonam group, 6 animals in each group, and another model group was set with 12 animals, of which 6 were 2 h model group. See Table 1 for specific groupings.

TABLE 1

Experimental grouping table for the protection of new antibiotics on mice pulmonary infection with *Pseudomonas aeruginosa*

| Group | Drug | Dose (mg/kg, day) | Administration way | Number of animals |
|---|---|---|---|---|
| A: Compound 41 high-dose group | Compound 41 | 60 | 2 h, 4 h, 6 h, 8 h; ip | 6 |
| B: Compound 41 low-dose group | Compound 41 | 20 | 2 h, 4 h, 6 h, 8 h; ip | 6 |
| C: Compound 44 high-dose group | Compound 44 | 60 | 2 h, 4 h, 6 h, 8 h; ip | 6 |
| D: Compound 44 low-dose group | Compound 44 | 20 | 2 h, 4 h, 6 h, 8 h; ip | 6 |
| E: Compound 46 high-dose group | Compound 46 | 60 | 2 h, 4 h, 6 h, 8 h; ip | 6 |
| F: Compound 46 low-dose group | Compound 46 | 20 | 2 h, 4 h, 6 h, 8 h; ip | 6 |

TABLE 1-continued

Experimental grouping table for the protection of new antibiotics on mice pulmonary infection with *Pseudomonas aeruginosa*

| Group | Drug | Dose (mg/kg, day) | Administration way | Number of animals |
|---|---|---|---|---|
| G: Reference compound group | AIC499 | 60 | 2 h, 4 h, 6 h, 8 h; ip | 6 |
| H: Aztreonam group | Aztreonam | 100 | 2 h, 4 h, 6 h, 8 h; ip | 6 |
| I: 2 h model group | — | — | — | 6 |
| J: Model group | 25% sulfobutyl β-cyclodextrin | — | 2 h, 4 h, 6 h, 8 h; ip | 6 |

(3) Pulmonary Infection with *Pseudomonas aeruginosa*

The mice were injected into the airway with 50 μL of bacterial solution ($2\times10^3$ CFU). Four mice in the model group were sacrificed by cervical dislocation 2 hours after infection.

(4) Administration

After 2 hours of infection, the groups were administered by intraperitoneal injection at 2 h, 4 h, 6 h and 8 h, 4 times in total.

(5) Bacterial Count 24 hours after infection, the mice in each group were sacrificed by cervical dislocation. Lung and kidney tissues were taken aseptically, put into sterilized tissue homogenization tubes respectively, weighed, and an appropriate amount of normal saline (NS) was added thereto, and homogenized for 1 min in homogenizer. The lung tissue of the animals in the model group was diluted $10^4$, $10^5$, and $10^6$ times, and the lung tissue of the animals in each administration group was diluted 10, 100 times, and the kidney tissue of the model group was diluted $10^2$, $10^3$, and $10^4$ times, and the kidney tissue of the animals in each administration group was diluted 10 times. TSA plate was coated with a spiral coater, and incubation was conducted overnight at 37° C., and CFU was counted with a colony counter.

(6) Weight

After the start of the experiment, the mice were weighed every day, and the changes in body weight were recorded.

(7) Data Processing

Lung tissue CFU scatter plots were made using Graphpad Prism software. SPSS19.0 software was used to calculate CFU, average body weight, and variance analysis was used to analyze the differences between groups.

4. Experimental Results

New monocyclic β-lactam antibiotics compound 41, compound 44, compound 46, I-g (AIC499) and aztreonam were injected intraperitoneally at 2 h, 4 h, 6 h and 8 h after infection; the animals were sacrificed at 24 h, and the lung tissue was aseptically collected, soaked in normal saline (NS) and the tissue was homogenized; 50 μL of the mixture was evenly spread on TSA plate after properly diluted, incubated overnight at 37° C. incubator, and the number of colonies were counted and converted into CFU per mL according to the dilution ratio, and then the logarithmic value of the number of bacterial loads was calculated as 10 was the base, and the mean and standard deviation of each group were compared. The results are shown in Table 2 and FIG. 1. The number of bacterial loads in the 24 h model group increased from $3.31\times10^4$ to $3.40\times10^9$ CFU (LOG10 of the number of bacterial loads was 9.53). Compared with the model group, each administration group was significantly lower. The number of bacterial loads in the high and low dose groups of the new antibiotic compound 164 was significantly lower than that in other drug groups, indicating that its in vivo efficacy is better.

TABLE 2

Number of pulmonary bacterial loads in the lungs of immunosuppressive mice with *Pseudomonas aeruginosa* infection treated with new monocyclic β-lactam antibiotics

| Group | Drug | Total dose (mg/kg, day) | Number of animals | LOG10 of the number of bacterial loads |
|---|---|---|---|---|
| Model group | — | — | 6 | 9.16 ± 0.68 |
| Compound 41 high-dose group | Compound 41 | 60 | 6 | 3.65 ± 2.15** |
| Compound 41 low-dose group | | 20 | 6 | 4.12 ± 1.50** |
| Compound 44 high-dose group | Compound 44 | 60 | 6 | 2.40 ± 1.99** |
| Compound 44 low-dose group | | 20 | 5 | 6.80 ± 0.94** |
| Compound 46 high-dose group | Compound 46 | 60 | 6 | 0.34 ± 0.85** |
| Compound 46 low-dose group | | 20 | 6 | 3.13 ± 2.45** |
| Reference compounds high-dose group | AIC499 | 60 | 6 | 1.65 ± 1.39** |
| Aztreonam group | Aztreonam | 100 | 6 | 6.91 ± 1.63** |

Note:
**means compared with the model group, $p < 0.01$, there is a very significant difference Experimental Conclusion The compounds of the present disclosure have in vivo curative effect on the pulmonary infection of *Pseudomonas aeruginosa* in immunosuppressive mice caused by cyclophosphamide, and can significantly reduce the number of bacterial loads in the lung tissue, and clear the infected *Pseudomonas aeruginosa* on the lung.

Experimental Embodiment 2: In Vitro Activity Test Scheme of Compounds Against CRE and CSE Strains Experimental Materials
1. Experimental Strains (1) Standard strains: *Escherichia coli* BAA-2452, *Escherichia coli* ATCC25922, *Klebsiella pneumoniae* BAA-1705; all purchased from ATCC.

(2) Clinical isolated strains: CRE *Klebsiella pneumoniae* 5846, 11544, 12559, 13249 and CSE *Klebsiella pneumoniae* 8733, a total of 5 strains;

CRE *Escherichia coli* 11119, 13897, 14828 and CSE *Escherichia coli* 8733, a total of 4 strains;

CRE *Enterobacter cloacae* 11090, 14653 and CSE *Enterobacter cloacae* 11699, a total of 3 strains;

CRE *Enterobacter aerogenes* 8193, a total of 1 strain;

CRE *Klebsiella oxytoca* 6777, 12391, 14151, 14153, a total of 4 strains

CRE *Citrobacter freundii* 9434, 9484 and CSE *Citrobacter freundii* 7646, a total of 3 strains;

CRE *Acinetobacter baumannii* 8476, 6383, a total of 2 strains; CRE *Serratia marcescens* 14541, a total of 1 strain; all collected in the Department of Infectious Diseases, West China Hospital, Chengdu, Sichuan Province, and kept in our laboratory.

Among them, there were 19 strains of CRE, 5 strains of CSE and 3 strains of standard strains.

2. Drugs to be Tested

Compound 32, Compound AIC499, Compound 41, Compound 44, Compound 43, Compound 46, Compound 45.

3. Control Drugs

Aztreonam, Meropenem.

4. Culture Medium

Mueller Hinton Agar (MHA) culture medium, purchased from BD Company.

5. Instruments and Equipment
   (1) Analytical balance, model: BSA 1245-CW, Sartorius Scientific Instruments (Beijing) Co., Ltd.
   (2) Autoclave sterilizer, model: MLS-3020, SANYO Electric Co. Ltd.
   (3) Biological safety cabinet, model: BSC-1300IIA2, Suzhou Antai Air Technology Co., Ltd.
   (4) Constant temperature foster box, model: B20, Thermo Fisher Scientific Co., Ltd.
   (5) Spectrophotometer, model: WPA S1200, Biochrom Experimental Method:

1. Recovery of Strains

The above-mentioned glycerol-preserved strains were taken out from the −80° C. refrigerator, streaked and inoculated on MHA plates, labeled, and cultured overnight in a 37° C. incubator.

2. Inoculum Preparation

The inoculum was prepared directly from bacterial suspension, and several recovered colonies were picked and directly prepared into a bacterial suspension with a turbidity of No. 0.5 McFarland units in normal saline, and a 10-fold dilution was made during inoculation.

3. Preparation of Drug-Containing Petri Dishes 6 bottles of MHA culture medium 500 mL/bottle were prepared, and the pH was adjusted to 7.2-7.4, sterilized at 121° C. for 15 min, and the medium was placed in a 55° C. water bath to keep warm.

About 10 mg of compound 32, aztreonam and meropenem were accurately weighed, dissolved in sterilized ultrapure water or dimethyl sulfoxide respectively so that the concentration was 12.8 mg/mL; the compounds were taken and dissolved in sterilized ultrapure water respectively so that the concentrations were both 12.8 mg/mL.

Sterile blank petri dishes were taken, and marked with each FL drug/concentration according to 2-fold dilution, and 10 concentrations of each drug starting from 8 μg/mL were tested. 25 μL of each drug compounds of 12.8 mg/mL were taken and added to MHA culture medium of 40 mL/bottle, mixed evenly, then 20 mL was aspirated and added to a petri dish consistent with the mark, and 20 mL of MHA culture medium was added to the rest of the drug-containing culture medium, and mixed evenly, that is, the 2-fold diluted drug-containing culture medium, then 20 mL was aspirated and added to the petri dish consistent with the mark, and then diluted to the 10th concentration by repeating the above-mentioned steps, and poured into the petri dish.

Sterile blank petri dishes were taken, marked with the concentration of aztreonam and meropenem according to 2-fold dilution, and 10 and 14 concentrations were tested starting from 128 μg/mL. 0.4 mL of aztreonam of 12.8 mg/mL and meropenem of 12.8 mg/mL were taken respectively, and added to MHA culture medium of 40 mL/bottle, mixed evenly; 20 mL was aspirated and added to a petri dish consistent with the mark, and then 20 mL of MHA culture medium was added to the rest of the drug-containing culture medium, mixed evenly, that is, the 2-fold diluted drug-containing culture medium; 20 mL was aspirated and added to the petri dish consistent with the mark, and then diluted to the 10th concentration and the 14th concentration respectively by repeating the above-mentioned steps, and then poured into the petri dish.

4 bacterial control petri dishes without drug were prepared at the same time as a control.

4. Inoculation, Culture and Result Observation

After the inoculation needle and the inoculation tube were sterilized at 121° C. for 15 min, 1 mL of the prepared bacterial solution was aspirated into the inoculation tube, and placed on the inoculation plate in order. The positioning needle and the inoculation needle were installed according to the order of placement of the colony on the inoculation plate. After inoculation, a bacterial solution circle was formed on the petri dish. After the bacterial solution was absorbed by the agar, the petri dish was placed in an incubator at 37° C. for overnight incubation (16-20 hours), and then taken out. The growth of the colony of the bacterial inoculation place was observed on each petri dish, and the lowest concentration that can completely or significantly inhibit bacterial growth was the minimum inhibitory concentration (MIC) of compounds.

Experimental Results

The minimum inhibitory concentrations of the compounds against the CRE and CSE strains were determined by the solid dilution method, and the results are shown in Tables 3 and 4.

According to the NCCLS standard, *Enterobacter* with MIC greater than or equal to 4 μg/mL is CRE strain, and *Enterobacter* with MIC less than or equal to 1 μg/mL is CSE strain, this experiment verified a total of 16 clinical CRE strains, a total of 7 clinical CSE strains, and the other strain was moderately drug resistant.

TABLE 3

MIC (μg/mL) results of compounds against CRE and CSE strains

| Strain name | Compounds and control drugs ||||||||| 
| | Aztreonam | Meropenem | 32 | AIC499 | 41 | 44 | 43 | 46 | 45 |
| --- | --- | --- | --- | --- | --- | --- | --- | --- | --- |
| E. ae 8193 | 32 | 16 | 0.5 | 1 | 0.5 | 0.5 | 2 | 1 | 4 |
| E. ae 14186 | >128 | 0.125 | 0.125 | 1 | 0.25 | 0.25 | 1 | 0.25 | 2 |
| E. cl 14653 | 128 | 64 | 0.25 | 1 | 0.5 | 0.25 | 1 | 0.5 | 2 |
| E. cl 11090 | >128 | 0.5 | 0.5 | 2 | 1 | 0.5 | 2 | 1 | 4 |
| E. cl 11699 | <0.25 | <0.015 | 0.03 | 0.06 | 0.06 | 0.03 | 0.125 | 0.125 | 0.25 |
| E. coli 11119 | >128 | 16 | 4 | >8 | 4 | 4 | >8 | 4 | 8 |
| E. coli 13897 | 64 | 4 | 0.06 | 0.25 | 0.06 | 0.125 | 0.25 | 0.125 | 0.5 |
| E. coli 14828 | >128 | 8 | 0.06 | 0.5 | 0.125 | 0.125 | 0.5 | 0.125 | 2 |

TABLE 3-continued

MIC (μg/mL) results of compounds against CRE and CSE strains

| Strain name | Aztreonam | Meropenem | 32 | AIC499 | 41 | 44 | 43 | 46 | 45 |
|---|---|---|---|---|---|---|---|---|---|
| *E. coli* 11256 | <0.25 | <0.015 | <0.015 | 0.06 | 0.03 | 0.03 | 0.125 | 0.03 | 0.25 |
| *E. coli* ATCC25922 | <0.25 | <0.015 | <0.015 | 0.03 | <0.015 | <0.015 | 0.06 | <0.015 | 0.125 |
| *E. coli* BAA-2452 | 8 | 16 | 0.25 | 0.5 | 0.25 | 0.25 | 0.5 | 0.25 | 1 |
| K.p 11544 | >128 | 32 | 2 | >8 | >8 | 8 | >8 | 8 | >8 |
| K.p 12559 | 4 | 4 | 0.125 | 0.5 | 0.125 | 0.125 | 0.5 | 0.25 | 0.5 |
| K.p 13249 | >128 | 64 | 4 | >8 | >8 | 8 | >8 | 8 | >8 |
| K.p 5846 | 128 | 8 | 0.06 | 0.25 | 0.125 | 0.125 | 0.5 | 0.125 | 1 |
| K.p 8733 | 8 | 0.03 | 0.06 | 0.25 | 0.125 | 0.06 | 0.25 | 0.125 | 0.5 |
| K.p BAA-1705 | >128 | 16 | 0.125 | 1 | 0.25 | 0.25 | 1 | 0.5 | 2 |
| *K. ox* 14151 | >128 | 16 | 0.125 | 0.5 | 0.25 | 0.25 | 1 | 0.25 | 2 |
| *K. ox* 14153 | >128 | 32 | 0.125 | 1 | 0.25 | 0.25 | 1 | 0.25 | 2 |
| *K. ox* 6777 | 128 | 16 | 0.125 | 0.5 | 0.25 | 0.25 | 1 | 0.25 | 2 |
| *K. ox* 12391 | 32 | 2 | 0.125 | 1 | 0.25 | 0.25 | 1 | 0.25 | 1 |
| C.f 9434 | >128 | >128 | 0.06 | 0.5 | 0.125 | 0.125 | 0.5 | 0.125 | 2 |
| C.f 9484 | 1 | 0.06 | 0.03 | 0.25 | 0.06 | 0.03 | 0.125 | 0.06 | 0.25 |
| C.f 7646 | 16 | <0.015 | 0.06 | 0.5 | 0.125 | 0.125 | 0.5 | 0.125 | 1 |
| A.B 8476 | 64 | 64 | 2 | 2 | 2 | 1 | 8 | 4 | >8 |
| A.B 6383 | 128 | 64 | 2 | 8 | 4 | 2 | >8 | 4 | >8 |
| *Sma* 14541 | >128 | 128 | 4 | >8 | >8 | >8 | >8 | >8 | >8 |

*E. ae*: *Enterobacter aerogenes*, *E. cl*: *Enterobacter cloacae*; *E. coli*: *Escherichia coli*; K.p: *Klebsiella pneumoniae*; *K. ox*: *Klebsiella oxytoca*; C.f: *Citrobacter freundii*; A.B: *Acinetobacter baumannii*; *Sma*: *Serratia marcescens*.

TABLE 4

MIC50, MIC90 and MIC range of compounds against 16 clinical CRE strains

| Compound | MIC50 (μg/mL) | MIC90 (μg/mL) | MIC range (μg/mL) |
|---|---|---|---|
| 32 | 0.125 | 4 | 0.06 to 4 |
| AIC499 | 2 | >8 | 0.25 to >8 |
| 41 | 1 | >8 | 0.06 to >8 |
| 44 | 0.5 | 8 | 0.125 to >8 |
| 43 | 2 | >8 | 0.25 to >8 |
| 46 | 1 | 8 | 0.125 to >8 |
| 45 | 4 | >8 | 0.5 to >8 |

Conclusion: The compounds of the present disclosure have a good inhibitory effect on various CRE and CSE strains.

The invention claimed is:

1. A method for treating pneumonia in a subject in need thereof, comprising: administering an effective amount of compound represented by formula (I) or a pharmaceutically acceptable salt thereof to the subject,

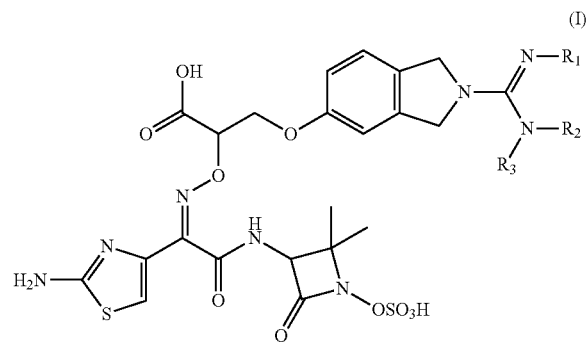

(I)

wherein, $R_1$ is selected from H and piperidinyl;

$R_2$ is selected from $-(O)_m-(CH_2)_n-NH_2$ and piperidinyl;

$R_3$ is selected from H and $-(CH_2)_n-NH_2$;

m is 0 or 1;

n is 1, 2 or 3.

2. The method as claimed in claim 1, wherein $R_2$ is selected from $-O-(CH_2)_2-NH_2-$, $-(CH_2)_2-NH_2$, $-(CH_2)_3-NH_2$ and piperidinyl.

3. The method as claimed in claim 1, wherein $R_3$ is selected from H, $-(CH_2)_2-NH_2$ and $-(CH_2)_3-NH_2$.

4. The method as claimed in claim 1, wherein $R_1$ is selected from H, and $R_2$ is selected from $-(CH_2)_2-NH_2$ and

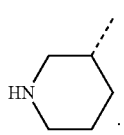

5. The method as claimed in claim 1, wherein $R_1$ is selected from piperidinyl, and $R_2$ is selected from piperidinyl.

6. The method as claimed in claim 5, wherein $R_1$ is selected from

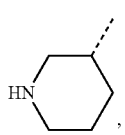

and R₂ is selected from

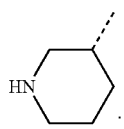

7. The method as claimed in claim 1, wherein the structural moiety

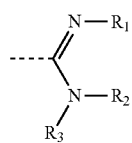

is selected from

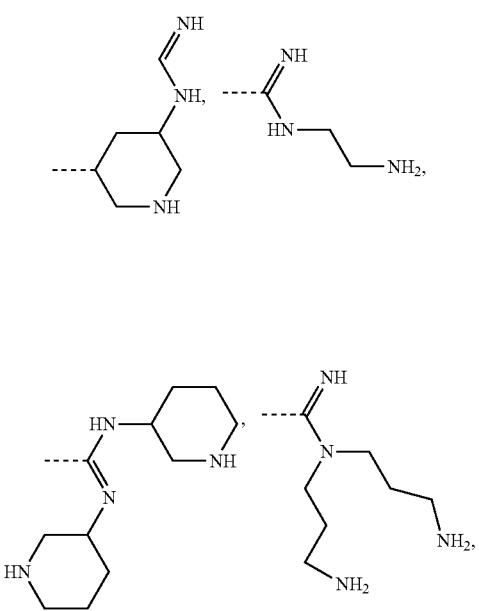

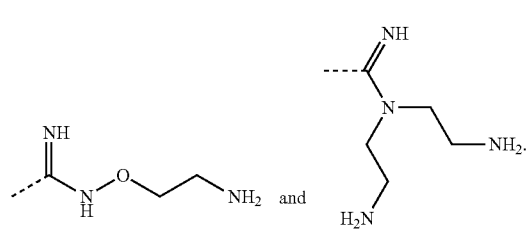

8. A method for treating pneumonia in a subject in need thereof, comprising: administering an effective amount of compound represented by the following formula or a pharmaceutically acceptable salt thereof to the subject, wherein the compound is selected from

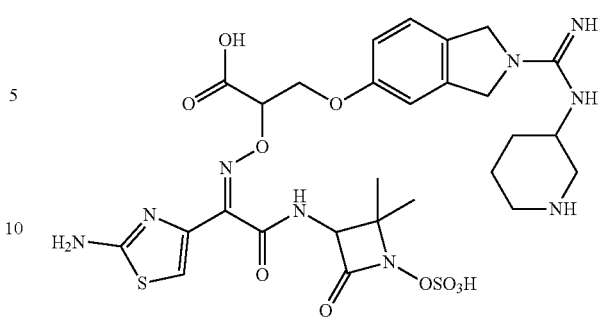

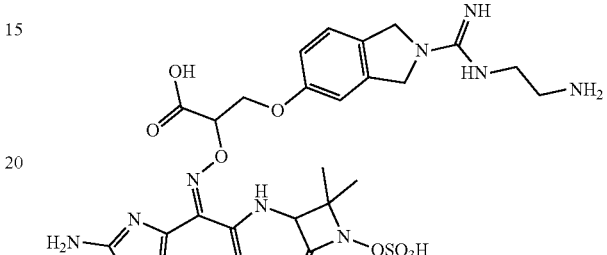

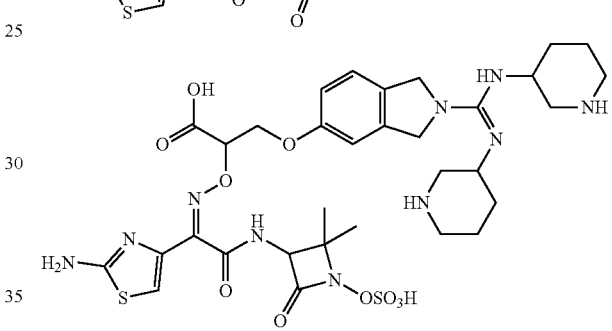

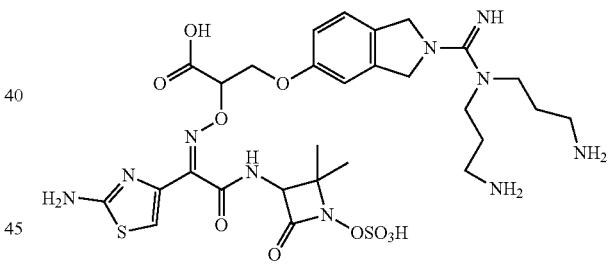

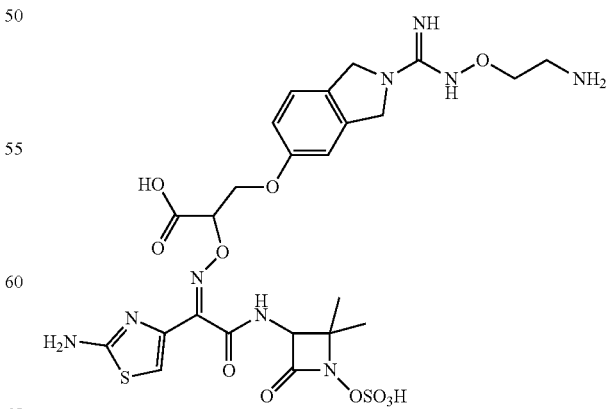

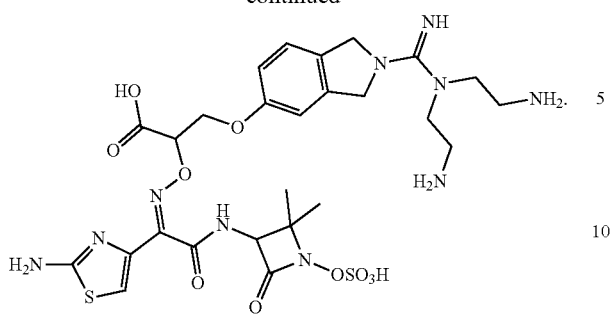

9. The method as claimed in claim 8, wherein, the compound is selected from

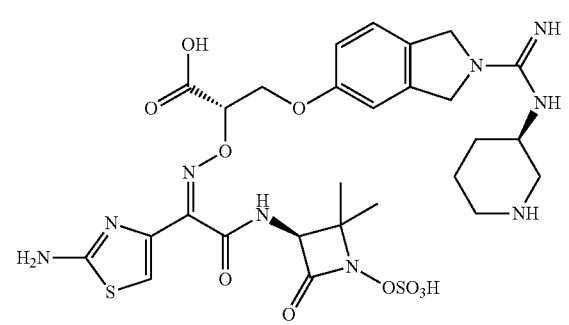

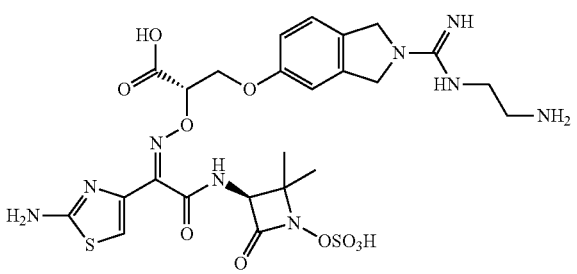

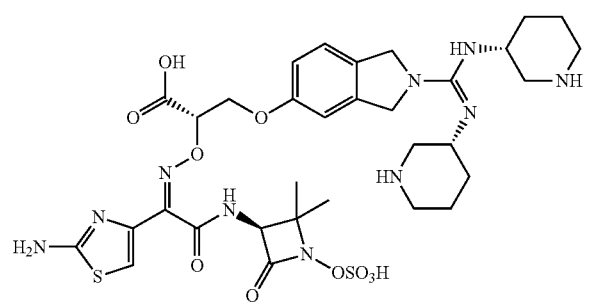

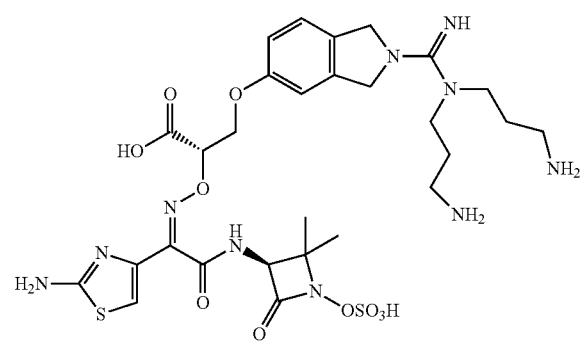

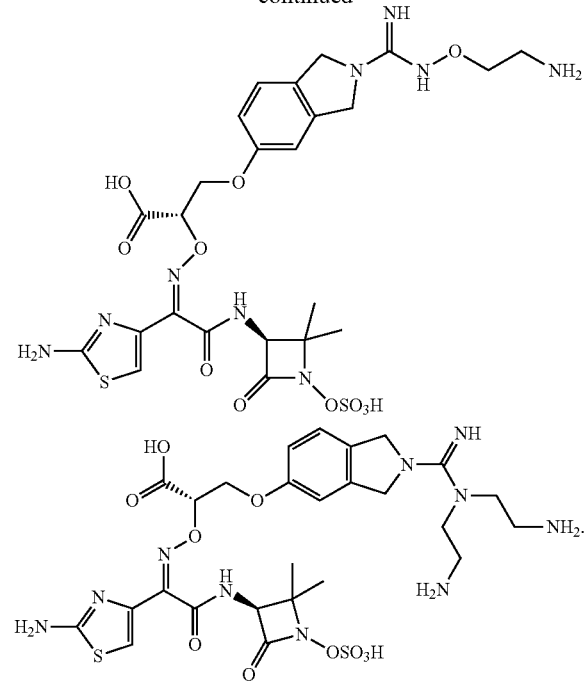

10. The method as claimed in claim 1, wherein the pneumonia is caused by infection with *Pseudomonas aeruginosa*.

11. The method as claimed in claim 1, wherein the pneumonia is caused by infection with one, two or multiple carbapenem-resistant bacteria, wherein, the carbapenem-resistant bacteria comprise carbapenem-resistant *Klebsiella pneumoniae*, carbapenem-resistant *Escherichia coli*, carbapenem-resistant *Enterobacter cloacae*, carbapenem-resistant *Enterobacter aerogenes*, carbapenem-resistant *Klebsiella oxytoca*, carbapenem-resistant *Citrobacter freundii*, carbapenem-resistant *Acinetobacter baumannii* and carbapenem-resistant *Serratia marcescens*.

12. The method as claimed in claim 1, wherein the pneumonia is caused by infection with one, two or multiple carbapenem susceptible bacteria, wherein the carbapenem susceptible bacteria comprise carbapenem susceptible *Klebsiella pneumoniae*, carbapenem susceptible *Escherichia coli*, carbapenem susceptible *Enterobacter cloacae*, and carbapenem susceptible *Citrobacter freundii*.

13. The method as claimed in claim 1, wherein the pneumonia is caused by infection with carbapenem-resistant *Enterobacter cloacae*, carbapenem-resistant *Enterobacter aerogenes*, carbapenem-resistant *Klebsiella oxytoca*, carbapenem-resistant *Citrobacter freundii*, carbapenem-resistant *Serratia marcescens*, carbapenem susceptible *Enterobacter cloacae* and/or carbapenem susceptible *Citrobacter freundii*.

14. The method as claimed in claim 8, wherein the pneumonia is caused by infection with *Pseudomonas aeruginosa*.

15. The method as claimed in claim 8, wherein the pneumonia is caused by infection with one, two or multiple carbapenem-resistant bacteria, wherein, the carbapenem-resistant bacteria comprise carbapenem-resistant *Klebsiella pneumoniae*, carbapenem-resistant *Escherichia coli*, carbapenem-resistant *Enterobacter cloacae*, carbapenem-resistant *Enterobacter aerogenes*, carbapenem-resistant *Klebsiella oxytoca*, carbapenem-resistant *Citrobacter freundii*, carbapenem-resistant *Acinetobacter baumannii* and carbapenem-resistant *Serratia marcescens*.

16. The method as claimed in claim 8, wherein the pneumonia is caused by infection with one, two or multiple carbapenem susceptible bacteria, wherein the carbapenem susceptible bacteria comprise carbapenem susceptible *Klebsiella pneumoniae*, carbapenem susceptible *Escherichia coli*, carbapenem susceptible *Enterobacter cloacae*, and carbapenem susceptible *Citrobacter freundii*.

17. The method as claimed in claim 8, wherein the pneumonia is caused by infection with carbapenem-resistant *Enterobacter cloacae*, carbapenem-resistant *Enterobacter aerogenes*, carbapenem-resistant *Klebsiella oxytoca*, carbapenem-resistant *Citrobacter freundii*, carbapenem-resistant *Serratia marcescens*, carbapenem susceptible *Enterobacter cloacae* and/or carbapenem susceptible *Citrobacter freundii*.

\* \* \* \* \*